US011616962B2

(12) United States Patent
Xu et al.

(10) Patent No.: US 11,616,962 B2
(45) Date of Patent: Mar. 28, 2023

(54) METHOD AND APPARATUS FOR VIDEO CODING

(71) Applicant: TENCENT AMERICA LLC, Palo Alto, CA (US)

(72) Inventors: Xiaozhong Xu, State College, PA (US); Shan Liu, San Jose, CA (US); Xiang Li, Saratoga, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/927,635

(22) Filed: Jul. 13, 2020

(65) Prior Publication Data

US 2021/0021841 A1    Jan. 21, 2021

Related U.S. Application Data

(60) Provisional application No. 62/912,310, filed on Oct. 8, 2019, provisional application No. 62/874,255, filed on Jul. 15, 2019.

(51) Int. Cl.
*H04N 19/176* (2014.01)
*H04N 19/80* (2014.01)

(52) U.S. Cl.
CPC .......... *H04N 19/176* (2014.11); *H04N 19/80* (2014.11)

(58) Field of Classification Search
CPC ...... H04N 19/70; H04N 19/52; H04N 19/117; H04N 19/159; H04N 19/593; H04N 19/174; H04N 19/463; H04N 19/124; H04N 19/86; H04N 19/157; H04N 19/46
See application file for complete search history.

(56) References Cited

U.S. PATENT DOCUMENTS

| | | |
|---|---|---|
| 7,330,509 B2 | 2/2008 | Lu et al. |
| 7,983,496 B2 | 7/2011 | Liu et al. |
| 8,085,852 B2 | 12/2011 | Liu et al. |
| 8,238,442 B2 | 8/2012 | Liu |
| 8,526,495 B2 | 9/2013 | Liu et al. |

(Continued)

FOREIGN PATENT DOCUMENTS

GB    2531087 A    4/2016

OTHER PUBLICATIONS

Jang et al.; "Non-CE5: Deblock filtering process for BDPCM block," Joint Video Experts Team (JVET) of ITU-T SG 16 WP 3 & ISO/IEC JTC 1/SC29/WG 11 15th Meeting: Gothenburg, SE, Jul. 3-12, 2019; JVET-O0582 (Year: 2019).*

(Continued)

*Primary Examiner* — Daniel Chang
(74) *Attorney, Agent, or Firm* — ArentFox Schiff LLP

(57) ABSTRACT

An apparatus includes processing circuitry configured to decode coding information of a current block from a coded video bitstream. The coding information can indicate that a first prediction mode of the current block is one of a plurality screen content coding (SCC) tools. The processing circuitry can determine whether at least one loop filter associated with the current block is disabled based on at least one of the first prediction mode of the current block and a first quantization parameter (QP) of the current block. In response to the at least one loop filter being determined as disabled, the processing circuitry can reconstruct the current block without the at least one loop filter.

12 Claims, 20 Drawing Sheets

(56) References Cited

U.S. PATENT DOCUMENTS

| | | | |
|---|---|---|---|
| 9,049,452 B2 | 6/2015 | Liu et al. | |
| 9,363,511 B2 | 6/2016 | Zhang et al. | |
| 9,769,472 B2 | 9/2017 | Liu et al. | |
| 9,924,175 B2* | 3/2018 | Pu | H04N 19/117 |
| 10,136,141 B2* | 11/2018 | Pu | H04N 19/176 |
| 10,136,144 B2 | 11/2018 | Liu et al. | |
| 10,205,968 B2 | 2/2019 | Liu et al. | |
| 10,397,569 B2 | 8/2019 | Liu et al. | |
| 10,455,231 B2 | 10/2019 | Xu et al. | |
| 10,511,834 B2 | 12/2019 | Xu et al. | |
| 10,542,253 B2 | 1/2020 | Liu et al. | |
| 10,567,752 B2 | 2/2020 | Zhao et al. | |
| 10,575,013 B2 | 2/2020 | Liu et al. | |
| 10,582,195 B2 | 3/2020 | Liu et al. | |
| 10,587,881 B2 | 3/2020 | Xu et al. | |
| 10,587,885 B2 | 3/2020 | Ye et al. | |
| 10,595,019 B2 | 3/2020 | Chernyak et al. | |
| 10,609,384 B2 | 3/2020 | Chen et al. | |
| 10,609,402 B2 | 3/2020 | Zhao et al. | |
| 10,609,403 B2 | 3/2020 | Xu et al. | |
| 2007/0286277 A1* | 12/2007 | Chen | H04N 19/146 375/E7.176 |
| 2008/0069247 A1* | 3/2008 | He | H04N 19/865 375/240.29 |
| 2011/0110427 A1* | 5/2011 | Teng | H04N 19/61 375/E7.104 |
| 2012/0328014 A1 | 12/2012 | Lim et al. | |
| 2013/0101025 A1* | 4/2013 | Van der Auwera | H04N 19/12 375/240.03 |
| 2013/0101027 A1* | 4/2013 | Narroschke | H04N 19/86 375/240.03 |
| 2013/0101031 A1* | 4/2013 | Van der Auwera | H04N 19/198 375/E7.193 |
| 2013/0188733 A1* | 7/2013 | Van der Auwera | H04N 19/105 375/240.24 |
| 2013/0294524 A1* | 11/2013 | Van Der Auwera | H04N 19/60 375/240.18 |
| 2013/0336395 A1* | 12/2013 | Joshi | H04N 19/70 375/240.12 |
| 2014/0192862 A1* | 7/2014 | Flynn | H04N 19/117 375/240.03 |
| 2014/0192869 A1* | 7/2014 | Laroche | H04N 19/147 375/240.12 |
| 2015/0023405 A1* | 1/2015 | Joshi | H04N 19/117 375/240.02 |
| 2015/0110181 A1* | 4/2015 | Saxena | H04N 19/176 375/240.12 |
| 2015/0281703 A1* | 10/2015 | Zou | H04N 19/94 375/240.24 |
| 2015/0365671 A1* | 12/2015 | Pu | H04N 19/117 375/240.03 |
| 2015/0365695 A1* | 12/2015 | Pu | H04N 19/186 375/240.16 |
| 2015/0373358 A1 | 12/2015 | Pang et al. | |
| 2015/0382016 A1* | 12/2015 | Cohen | H04N 19/70 375/240.12 |
| 2016/0057430 A1* | 2/2016 | Kolesnikov | H04N 19/103 375/240.12 |
| 2016/0100174 A1* | 4/2016 | Yu | H04N 19/44 375/240.24 |
| 2016/0261863 A1* | 9/2016 | Chen | H04N 19/82 |
| 2016/0330481 A1* | 11/2016 | Zhang | H04N 19/96 |
| 2017/0054996 A1 | 2/2017 | Xu et al. | |
| 2017/0094271 A1 | 3/2017 | Liu et al. | |
| 2017/0180737 A1* | 6/2017 | Ye | H04N 19/70 |
| 2017/0302958 A1* | 10/2017 | Li | H04N 19/117 |
| 2018/0184093 A1* | 6/2018 | Xu | H04N 19/58 |
| 2018/0324418 A1 | 11/2018 | Koo et al. | |
| 2019/0007684 A1* | 1/2019 | Van Der Auwera | H04N 19/172 |
| 2020/0260070 A1* | 8/2020 | Yoo | H04N 19/103 |
| 2020/0314423 A1* | 10/2020 | Hu | H04N 19/96 |

OTHER PUBLICATIONS

Bross et al., "General Video Coding Technology in Responses to the Joint Call for Proposals on Video Compression with Capability beyond Hevc," IEEE Transactions on Circuits and Systems for Video Technology, 2019 (16 pages).

Liu et al., "Deep Learning-Based Technology in Responses to the Joint Call for Proposals on Video Compression with Capability beyond HEVC," IEEE Transactions on Circuits and Systems for Video Technology, 2019 (14 pages).

Zhu et al., "Residual Convolutional Neural Network Based In-Loop Filter With Intra and Inter Frames Processed Respectively for AVS3," 2020 IEEE International Conference on Multimedia & Expo Workshops (ICMEW), London, UK, Jul. 2020 (6 pages).

Liu et al., "Joint Temporal-Spatial Bit Allocation for Video Coding With Dependency," IEEE Transactions on Circuits and Systems for Video Technology, vol. 15, No. 1, pp. 15-26, Jan. 2015 (13 pages).

Joshi et al., "High Efficiency Video Coding (HEVC) Screen Content Coding: Draft 4," JCTVC-U1005, 21st Meeting: Warsaw, PL, Jun. 19-26, 2015 (661 pages).

Joshi et al., "Screen content coding test model 1 (SCM 1)," JCTVC-Q1014, 17th Meeting: Valencia, ES, Mar. 27-Apr. 4, 2014 (5 pages).

Xu et al., "Block Vector Prediction in Intra Block Copy for HEVC Screen Content Coding," 2015 Data Compression Conference (10 pages).

Xu et al., "Intra block copy in Versatile Video Coding with Reference Sample Memory Reuse," 2019 Picture Coding Symposium (PCS) (5 pages).

Chen et al., "Screen Content Coding Using Non-Square Intra Block Copy for HEVC," 2014 IEEE International Conference on Multimedia and Expo (ICME), Chengdu, China, Jul. 2014 (6 pages).

Wang et al., "Intra Block Copy in AVS3 Video Coding Standard," 2020 IEEE International Conference on Multimedia & Expo Workshops (ICMEW), London, UK, Jul. 2020 (6 pages).

Liu et al., "Hybrid global-local motion compensated frame interpolation for low bit rate video coding," Journal of Visual Communication and Image Representation 14(1) (19 pages).

Liu et al., "Nonlinear motion-compensated interpolation for low-bit-rate video," Applications of Digital Image Processing XXIII 4115 (12 pages).

Zhang et al., "Intra Mode Coding in HEVC Standard," 2012 Visual Communications and Image Processing (6 pages).

Liu et al., "Bit-depth Scalable Coding for High Dynamic Range Video," Visual Communications and Image Processing 2008, vol. 6822 (10 pages).

Li et al., "Methodology and reporting template for neural network coding tool testing," JVET-M1006, 13th Meeting: Marrakech, MA, Jan. 9-18, 2019 (4 pages).

Liu et al., "JVET AHG report 9: Neural Networks in Video Coding (AHG9)," JVET-J0009, 10th Meeting: San Diego, US, Apr. 10-20, 2018 (3 pages).

Xu et al., "Intra Block Copy in HEVC Screen Content Coding Extensions," IEEE Journal On Emerging And Selected Topics In Circuits And Systems, Jun. 22, 2016 (11 pages).

Liu et al., "Overview of HEVC extensions on screen content coding," SIP vol. 4, E10, 2015 (12 pages).

Wei Pu et al., "Palette Mode Coding in HEVC Screen Content Coding Extension", IEEE Journal on Emerging and Selected Topics in Circuits and Systems, vol. 6, No. 4, Dec. 2016 (13 pages).

Jicheng An et al., "Quadtree plus Binary Tree Structure with JEM tools", Joint Video Exploration Team (JVET) of ITU-T SG 16 WP 3 and ISO/IEC JTC 1/SC 29/WG11, JVET-B0023, 2nd Meeting: San Diego, USA, Feb. 20-26, 2016 (10 pages).

Yung-Hsuan Chao et al., "CE8-2.1:Palette mode in HEVC", Joint Video Experts Team (JVET) of ITU-T SG 16 WP 3 and ISO/IEC JTC 1/SC 29/WG11, JVET-O0119, 15th Meeting: Gothenburg, SE, Jul. 3-12, 2019 (7 pages).

International Search Report and Written Opinion dated Oct. 9, 2020 in PCT/US20/41948, with English translation, 16 pages.

Sole Jet Al: "Non-SCCE3: Palette and deblocking", 18. JCT-VC Meeting; Jun. 30, 2014-Sep. 7, 2014; Sapporo (Joint Collaborative

(56) References Cited

OTHER PUBLICATIONS

Team On Video Coding of ISO/IEC JTC1/SC29/WG11 and ITU-T SG.16 ); URL: HTTP://WFTP3.ITU.INT/AV-ARCH/JCTVC-SITE/,, No. JCTVC-R0213, Jun. 21, 2014, pp. 1-6.

Andrey Norkin et al.: "HEVC Deblocking Filter", IEEE Transactions On Circuits and Systems for Video Technology, IEEE, USA, vol. 22, No. 12, Dec. 1, 2012 (Dec. 1, 2012), pp. 1746-1754.

Supplementary European Search Report dated Apr. 4, 2022 in Application No. 20840936.7.

Guillaume Laroche, et al., AHG10: On IBC memory reduction, Joint Collaborative Team on Video Coding (JCT-VC) of ITU-T SG 16 WP 3 and ISO/IEC JTC 1/SC 29/WG 11, JCTVC-T0051, Feb. 9, 2015, pp. 1-7.

Japanese Office Action dated Dec. 20, 2022 in Application No. 2021-557670, with English Translation, pp. 1-11.

\* cited by examiner

METHOD AND APPARATUS FOR VIDEO CODING

INCORPORATION BY REFERENCE

This present disclosure claims the benefit of priority to U.S. Provisional Application No. 62/874,255, "Intra Prediction Mode Mapping and Filter Disabling for Palette Coded Blocks" filed on Jul. 15, 2019, and U.S. Provisional Application No. 62/912,310, "High Level Control of Deblocking Usage for Screen Content Coding" filed on Oct. 8, 2019, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. in some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from 11.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and 11265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in 112.65 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to TEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/TIEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry decodes coding information of a current block from a coded video bitstream where the coding information indicates that a first prediction mode of the current block is one of a plurality screen content coding (SCC) tools. The processing circuitry determines whether at least one loop filter associated with the current block is disabled based on at least one of the first prediction mode of the current block and a first quantization parameter (QP) of the current block. In response to the at least one loop filter being determined as disabled, the processing circuitry can reconstruct the current block without the at least one loop filter.

In an embodiment, the at least one loop filter is a deblocking filter (DBT) for a boundary between the current block and a neighboring block of the current block. The first prediction mode is an intra block copy (IBC) mode or a palette coding mode. The processing circuitry determines whether to the DBF for the boundary between the current block and the neighboring block is disabled based on at least one of (i) the first prediction mode of the current block, (ii) a second prediction mode of the neighboring block, (iii) the first QP of the current block, and (iv) a second QP of the neighboring block. In an example, the processing circuitry determines whether the DBF for the boundary between the current block and the neighboring block is disabled based on at least one of the first prediction mode and the second prediction mode. In an example, the processing circuitry determines that the DBF for the boundary between the current block and the neighboring block is disabled when at least one of the first prediction mode and the second prediction mode is the IBC mode or the palette coding mode.

In an example, the processing circuitry determines that the DBF for the boundary between the current block and the neighboring block is disabled when (i) the first QP is less than a threshold or the first QP and the second QP are less than the threshold and (ii) one of the first prediction mode and the second prediction mode is the palette coding mode or the IBC mode.

In an embodiment, the first prediction mode of the current block is an IBC mode or a palette coding mode. The at least one loop filter for the current block includes at least one of an adaptive loop filter, a sample adaptive offset filter, and a bi-lateral filter. The processing circuitry determines whether the at least one loop filter is disabled based on the first QP and the first prediction mode.

Aspects of the disclosure provide methods and apparatuses for video encoding/decoding. In some examples, an apparatus for video decoding includes processing circuitry. The processing circuitry decodes coding information for a group of blocks that includes a current block from a coded video bitstream. The coding information indicates a filter control flag associated with the group of blocks and the current block can be coded with a screen content coding (SCC) tool. The processing circuitry determine whether at least one loop filter for the current block is disabled based on the filter control flag and reconstructs the current block without the at least one loop filter in response to the at least one loop filter being determined as disabled.

In an embodiment, the processing circuitry determines that the at least one loop filter for the current block is disabled based on the filter control flag, the filter control flag being associated with the group of blocks or being specific to the SCC tool.

In an embodiment, the processing circuitry determines that the at least one loop filter for the current block is disabled based on the filter control flag associated with the group of blocks.

In an embodiment, the filter control flag is specific to the SCC tool.

In an embodiment, the filter control flag is specific to the SCC tool or applicable to a plurality of SCC tools including the SCC tool. The filter control flag is conditionally signaled based on Nether a. SCC flag is signaled in a level higher than a block level to indicate that the SCC tool or the plurality of SCC tools is enabled for the level higher than the block level.

In an embodiment, the filter control flag is specific to the SCC tool, and the filter control flag is conditionally signaled based on whether a SCC flag is signaled in a level higher than a block level to indicate that the SCC tool is enabled for the level higher than the block level.

In an embodiment, the filter control flag is applicable to a plurality of SCC tools including the SCC tool, and the filter control flag is conditionally signaled based on whether a SCC flag is signaled in a level higher than a block level to indicate that the plurality of SCC tools is enabled for the level higher than the block level.

In an embodiment, the filter control flag is applicable to a plurality of SCC tools including the SCC tool, and the filter control flag is conditionally signaled based on whether a SCC flag is signaled in a level higher than a block level to indicate that the SCC tool is enabled for the level higher than the block level.

In an embodiment, the processing circuitry determines whether to disable the at least one loop filter based on the filter control flag and a quantization parameter (QP) of the current block.

In an embodiment, the at least one loop filter includes a deblocking filter (DBF) for a boundary between the current block and a neighboring block in the group of blocks. The processing circuitry determines whether the DBF for the boundary between the current block and the neighboring block is disabled based on the filter control flag and at least one of (i) the SCC tool and (ii) a prediction mode of the neighboring block.

In an embodiment, the at least one loop filter includes one or more of a deblocking filter (DBF), an adaptive loop filter, a sample adaptive offset filter, and a bi-lateral filter. The filter control flag is signaled in one or more of a sequence parameter set (SPS), a picture parameter set (PPS), a picture header, a slice header, a tile group level, and a tile level. The SCC tool includes one of (i) an intra block copy (IBC) mode, (ii) a palette coding mode, (iii) a block differential pulse coded modulation (BDPCM) mode, and (iv) a transform skip mode.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIGS. 10A-10D show examples of intra block copy according to an embodiment of the disclosure.

DETAILED DESCRIPTION OF EMBODIMENTS

Figure 3:
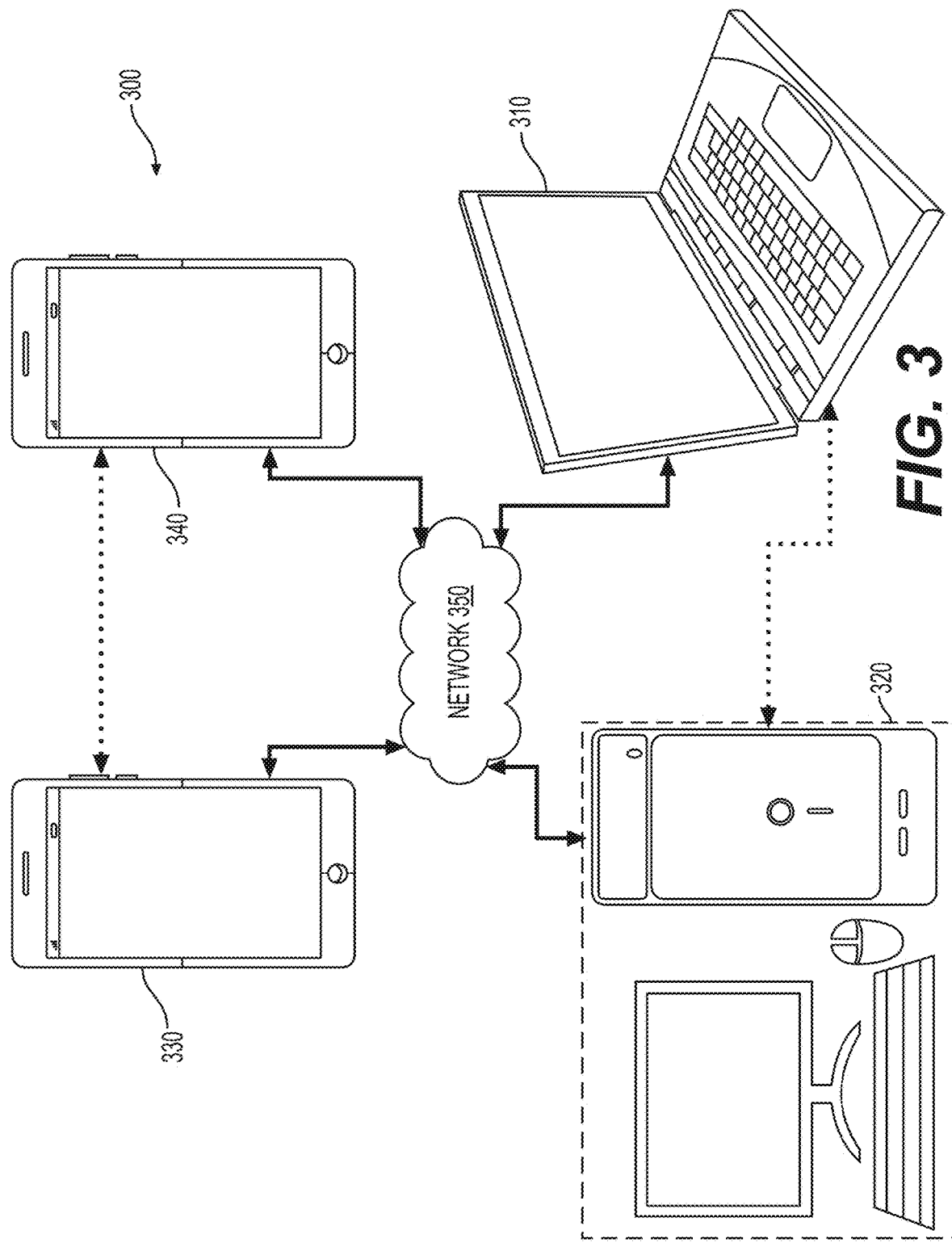
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a. network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data. (e.g., a stream of video pictures that are captured by the terminal device) for transmission to the other terminal device of the terminal devices (330) and (340) via the network (350), Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
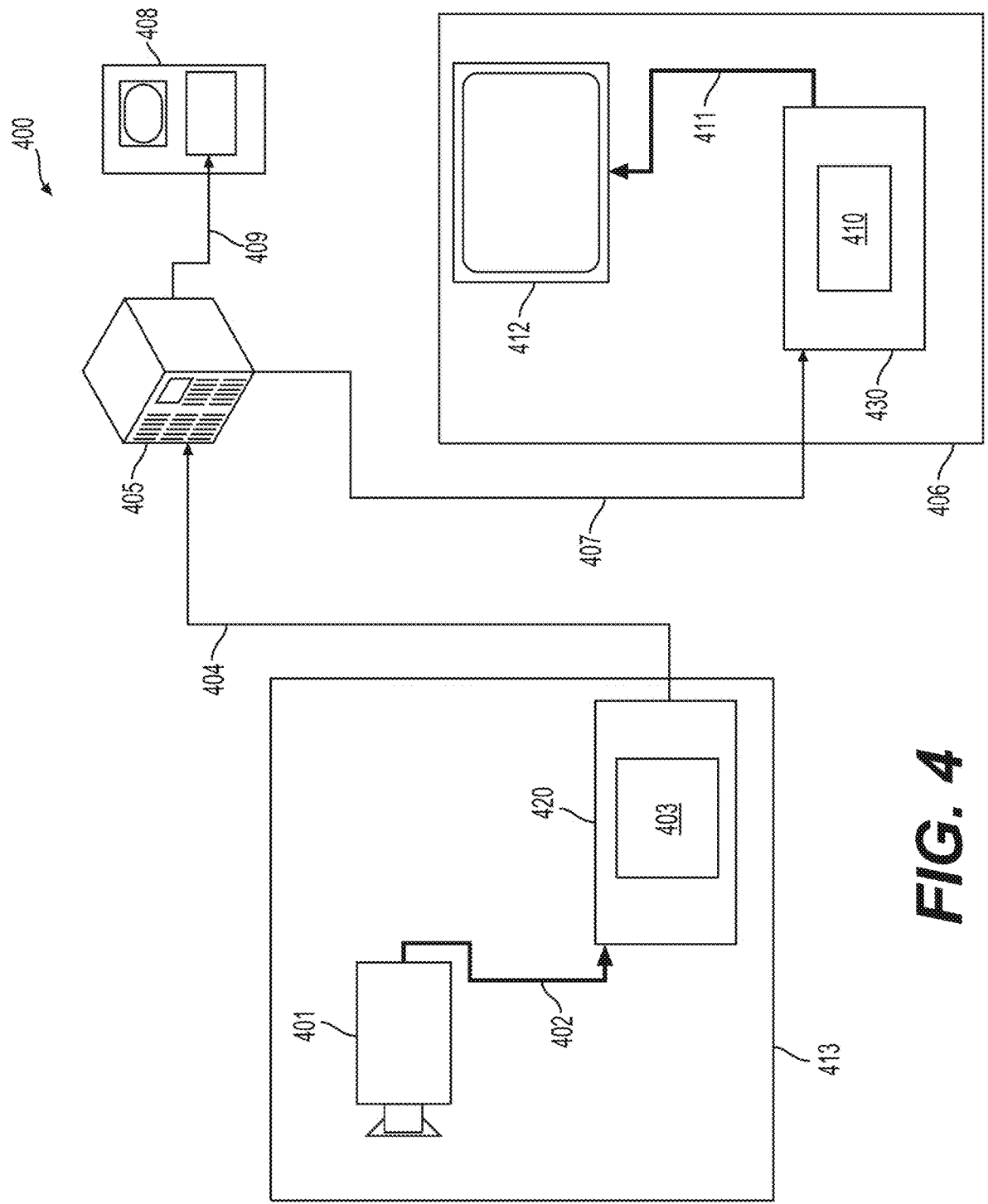
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a. video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
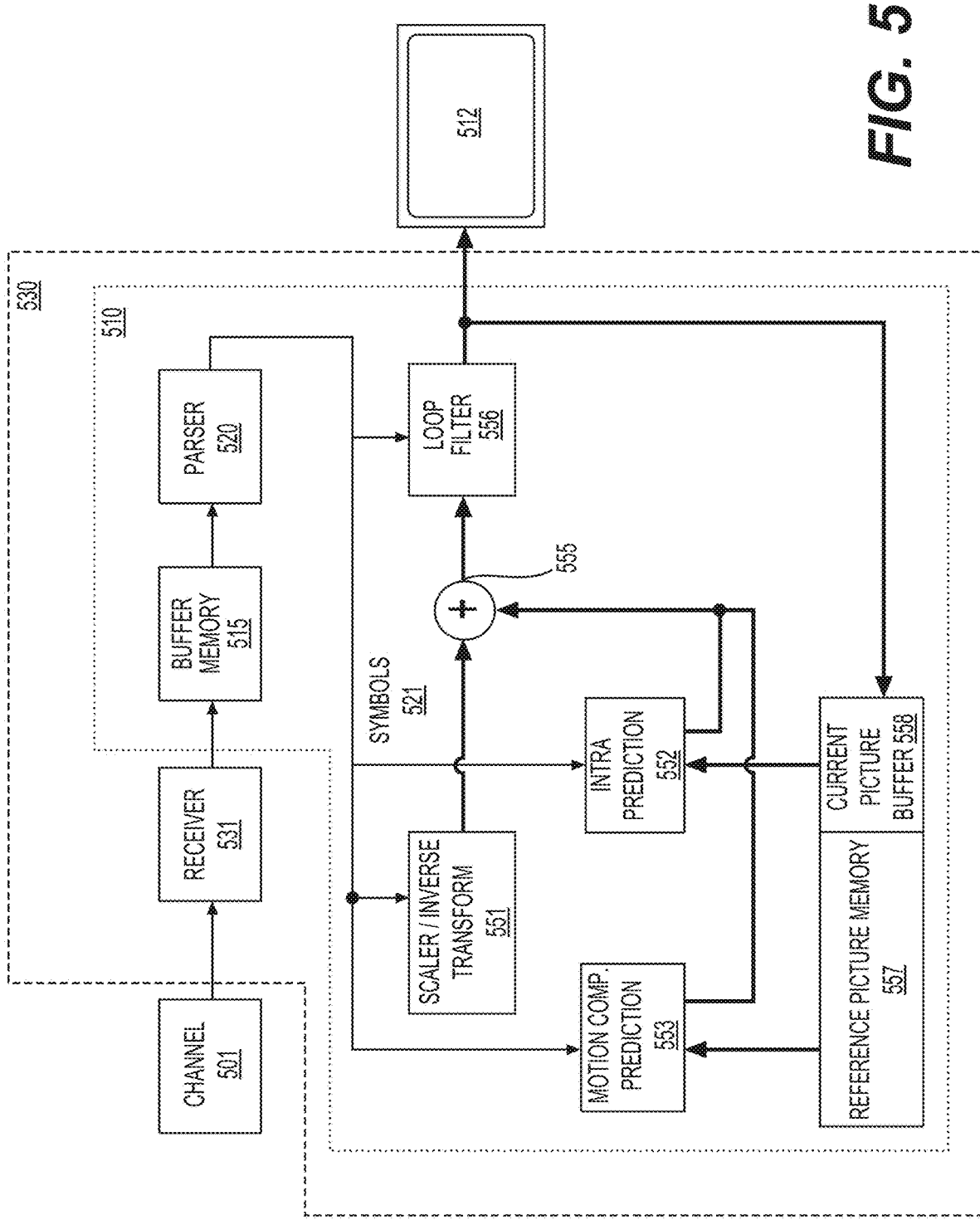
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
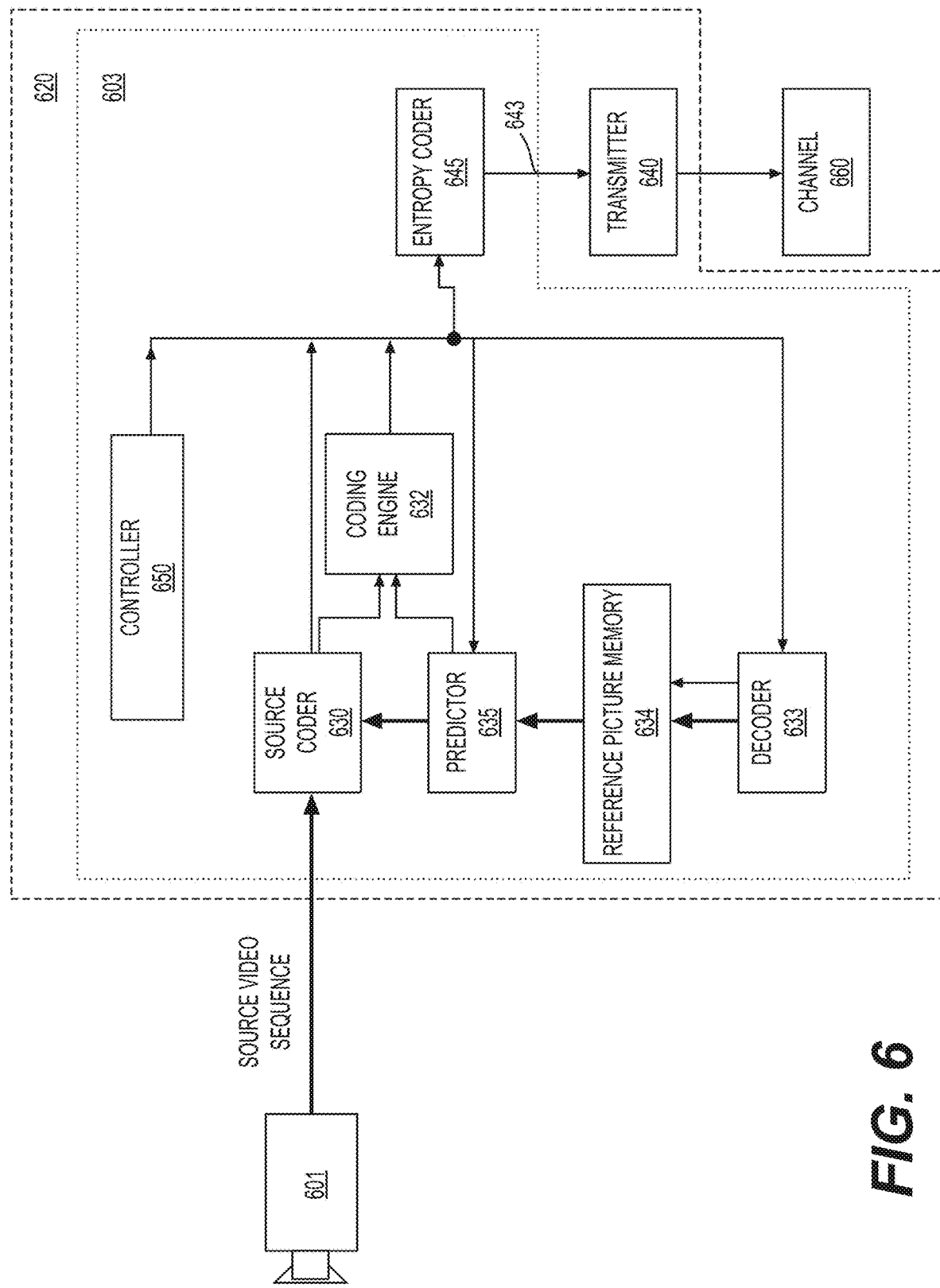
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data, The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VIA parameter set fragments, and so on.

A video may be captured as a plurality of source pictures (video pictures) temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a hi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEN/C standard, a picture in a sequence of video pictures is partitioned into coding tree units (CTU) for compression, the CTUs in a picture have the same size, such as 64×64 pixels, 32×32 pixels, or 16×16 pixels. In general, a CM includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
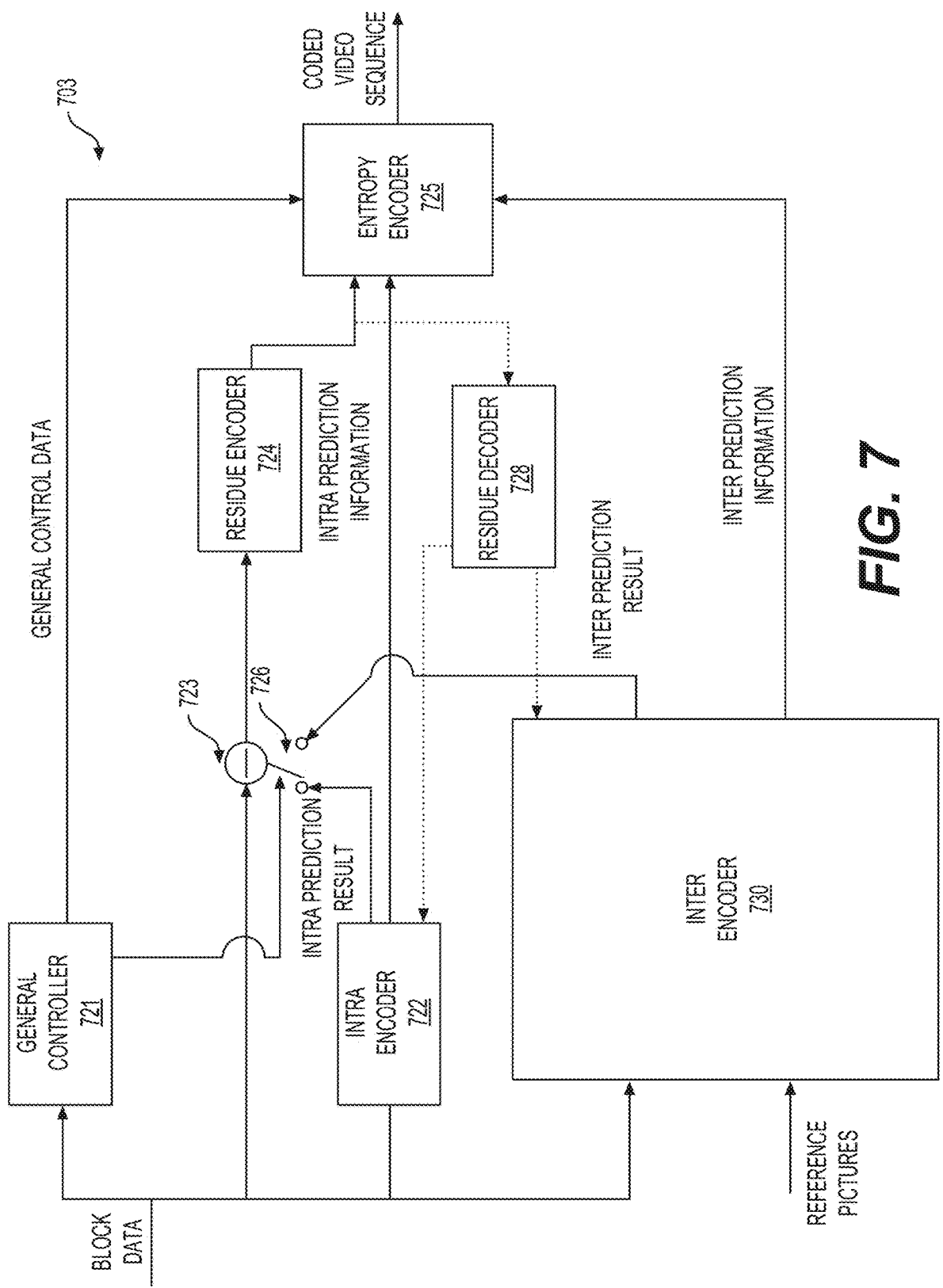
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC; example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or hi-prediction mode, the video encoder (703) may use an inter prediction or hi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data. to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
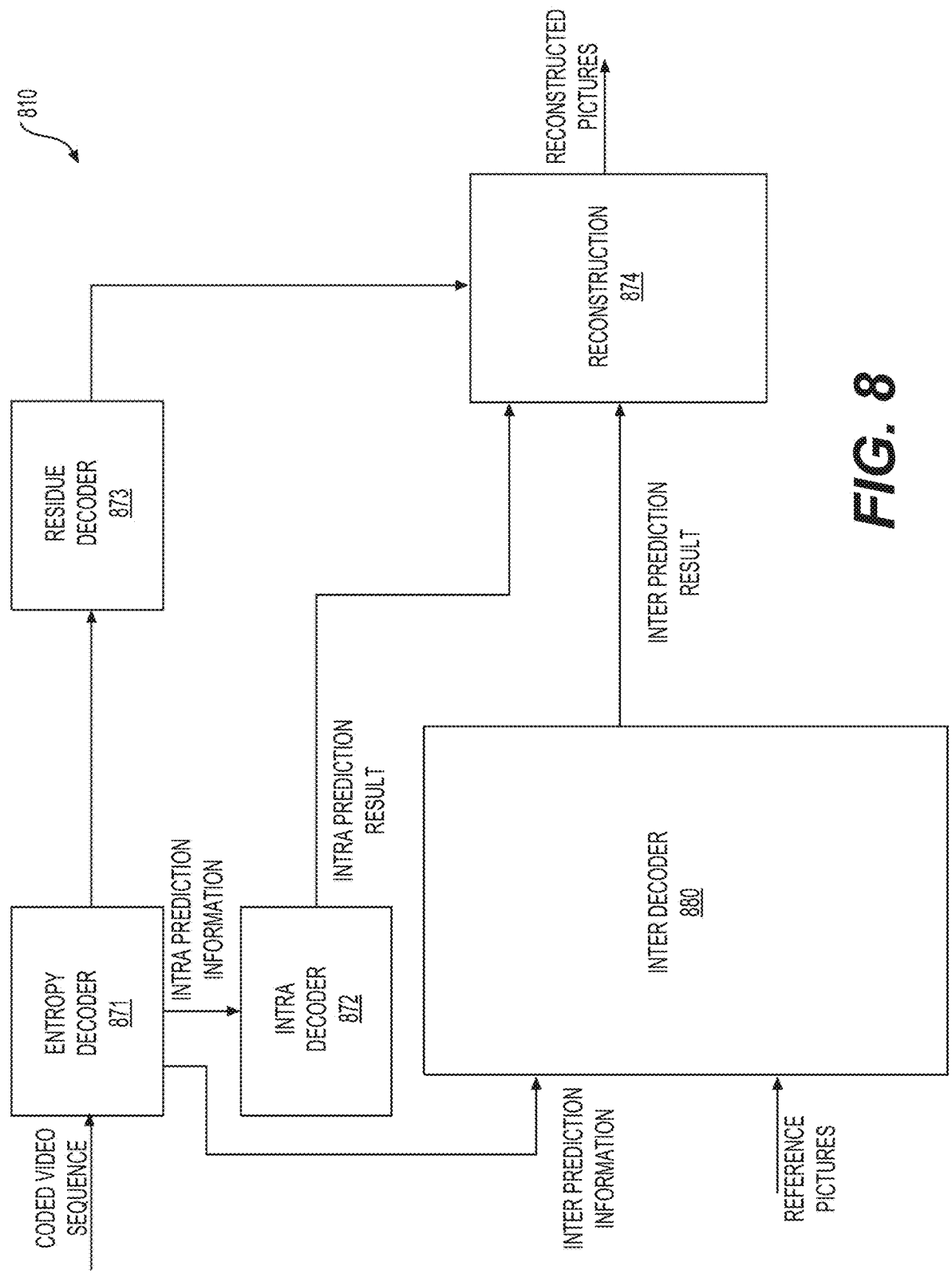
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded. picture, certain symbols that represent the syntax elements of which the coded picture is made up. Such symbols can include, for example, the mode in which a block is coded (such as, for example, intra mode, inter mode, hi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or hi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

In various embodiments, due to specific characteristics of screen content, screen content coding (SCC) tools can be developed, such as the SCCs for the Screen Coding Extension of HEVC. The SCC tools can have significant gains in coding efficiency. One of the SCC tools is referred to as a palette coding mode (or a palette mode, a palette mode coding method, a palette coding process) where a block of pixels (or samples) can be represented using indices to a palette (e.g., including major colors). The palette and the indices can be encoded by exploiting spatial redundancy. In some examples, a palette coding mode can include two parts, such as coding method(s) for the palette and coding method(s) for the samples using the palette. The coding method(s) for the samples using the palette can include palette index coding, run length coding, escape pixel coding, and/or the like. Below are some examples of the palette coding mode.

Major colors can be selected as follows. A simple and efficient histogram based algorithm can be used to classify pixels or samples in a block. For example, the most significant L peak values in a histogram are selected as the major colors, and pixel values that are close to one of the major colors can be quantized to the one of the major colors. In an example, other pixels that do not belong to any major color (or any major color set) can be referred to as escape pixels. The escape pixels can be quantized before being coded. In an example, quantization process(es) are not used for a lossless coding process. For each pixel in the block, a color index (also referred to as index for convenience) can be assigned to indicate which of the major color sets the pixel belongs to. If L major colors are used, values (e.g., 0 to L−1) of the L major colors can be signaled for the L major colors (or the L major color sets) and a value N of a major color can be signaled for an escape pixel set, for example, including the escape pixels. N can be different from the values (e.g., 0 to L−1) of the L major colors. In an example, N is larger than (L−1). The palette can be generally implemented as a color lookup table where each color entry can be associated with a color index. A single palette can be used to code both luma and chroma components. Each entry can represent a specific RGB color, a YUV color, or the like. For example, an entry 1 with (R, G. B)=(0, 0, 0) represents a pure black color while an entry 0 with (R, G, B)=(2, 10, 200) represents a bluish color. When the video format is 420, the chroma plane can be up sampled to generate the color palette.

In the palette mode coding, a palette-based coding can be performed on a CU basis.

The palette entries can be encoded as below. To code a current palette using a palette predictor list as a reference, a binary vector can be used to indicate whether each entry in the palette predictor list can be reused in the current palette. The one or more reused entries can be placed at the beginning of the current palette while maintaining an order of the one or more reused entries in the palette predictor list. One or more new palette entries which are not in the palette predictor list can follow the one or more reused entries. In an example, a palette initializer with predefined entries can optionally be used to initialize the palette predictor list, resulting in improved coding efficiency in such a scenario. A palette initializer can be signaled in a picture parameter set (PPS), a sequence parameter set (SPS), or the like.

Color indices can be encoded as below. After classification, the pixels of the block can be converted into the color indices according to the selected major color set. A predictive coding method can be applied to the color indices, where a pixel line can be predicted by multiple different modes (e.g., three different modes), including a horizontal mode (e.g., a copy index mode), a vertical mode (e.g., a copy above mode), and a normal mode (e.g., an escape mode). In some examples, two index scan orders (e.g., a horizontal traverse scan and a vertical traverse scan) are used when coding the color indices. An index rotation flag can be signaled to indicate which of the two index scan orders is used.

In the copy index mode, starting from a first pixel, one or more consecutive indices can be copied from the first pixel. A color index of the first pixel can be signaled.

In the copy above mode, one or more consecutive color indices can be copied from an above pixel line, for example, a pixel line that is above a current pixel line.

In the escape mode, when an escape pixel is encountered, for example, signaled by the largest index (e.g., N) in major color set, a corresponding pixel value can be coded after the largest index (e.g., N). There may be multiple escape pixels with different color values in the CU. For different escape pixel locations, the pixel values of the escape pixels may be different.

For each copy index mode, an index value can be signaled. The index signaling can be grouped in the front (or beginning), for example, to improve a context-adaptive binary arithmetic coding (CABAC) throughput. Similarly, the pixel values of the escape pixels can be signaled in the back, for example, to improve the CABAC throughput. The copy index mode and the copy above mode can be signaled between the indices coding and the escape coding.

Separate coding tree structures can be used for luma and chroma components. in some examples, a CU includes samples of both the luma and chroma components. In some examples, such as in JVET, samples of the chroma component can have an independent or a separate split tree structure (or coding tree structure) as compared to the luma component. The separate coding tree structure can start from a CTU level. In an example, a chroma CU (e.g., a CU that includes only two chroma components) is larger than a luma counterpart of the chroma CU at a corresponding sample location.

In an embodiment, such as in VTM5.0, multiple intra prediction modes (e.g., eight intra prediction modes) for chroma blocks can include a Planar mode, a DC mode, a horizontal mode (or a horizontal prediction mode), a vertical mode (or a vertical prediction mode), three cross component linear model (CCLM) modes, and a derived mode (DM). When a chroma block is encoded using the DM mode, an actual intra prediction mode applied to the chroma block can be derived from an intra prediction mode of a corresponding luma block. When the corresponding luma block is encoded using a mode other than a normal intra mode, the DC mode can be applied (or assigned) to the luma block so that the chroma block can derive the actual intra prediction mode based on the DC mode.

When the luma and chroma color planes are coded separately, for a chroma coding block, a corresponding luma block may be coded in the palette coding mode. In an example, an assignment of an intra prediction mode for the corresponding luma block coded in the palette coding mode can be improved.

Block based compensation can be used for inter prediction and intra prediction. For the inter prediction, block based compensation from a different picture is known as motion compensation. Block based compensation can also be done from a previously reconstructed area within the same picture, such as in intra prediction. The block based compensation from reconstructed area within the same picture is referred to as intra picture block compensation, current picture referencing (CPR), or intra block copy (IBC). A displacement vector that indicates an offset between a current block and a reference block (also referred to as a prediction block) in the same picture is referred to as a block vector (BV) where the current block can be encoded/decoded based on the reference block. Different from a motion vector in motion compensation, which can be at any value (positive or negative, at either x or y direction), a BV has a few constraints to ensure that the reference block is available and already reconstructed. Also, in some examples, for parallel processing consideration, some reference area that is tile boundary, slice boundary, or wavefront ladder shape boundary is excluded.

The coding of a block vector could be either explicit or implicit. In the explicit mode (similar to an AMVP mode in inter coding), a BV difference between a block vector and its predictor is signaled. In the implicit mode, the block vector is recovered from a predictor (referred to as block vector predictor) without using the BV difference, in a similar way as a motion vector in merge mode. The resolution of a block vector, in some implementations, is restricted to integer positions. In other systems, the block vector is allowed to point to fractional positions.

In some examples, the use of intra block copy at a block level can be signaled using a block level flag, such as an IBC flag. In an embodiment, the block level flag is signaled when the current block is coded explicitly (e.g., not coded in a merge mode). In some examples, the use of intra block copy at a block level can be signaled using a reference index approach. The current picture under decoding is then treated as a reference picture or a special reference picture. In an example, such a reference picture is put in the last position of a list of reference pictures. The special reference picture is also managed together with other temporal reference pictures in a buffer, such as a decoded picture buffer (DPB).

There are also some variations for intra block copy, such as flipped intra block copy (the reference block is flipped horizontally or vertically before used to predict a current block), or line based intra block copy (each compensation unit inside an M×N coding block is an M×1 or 1×N line)

Figure 9:
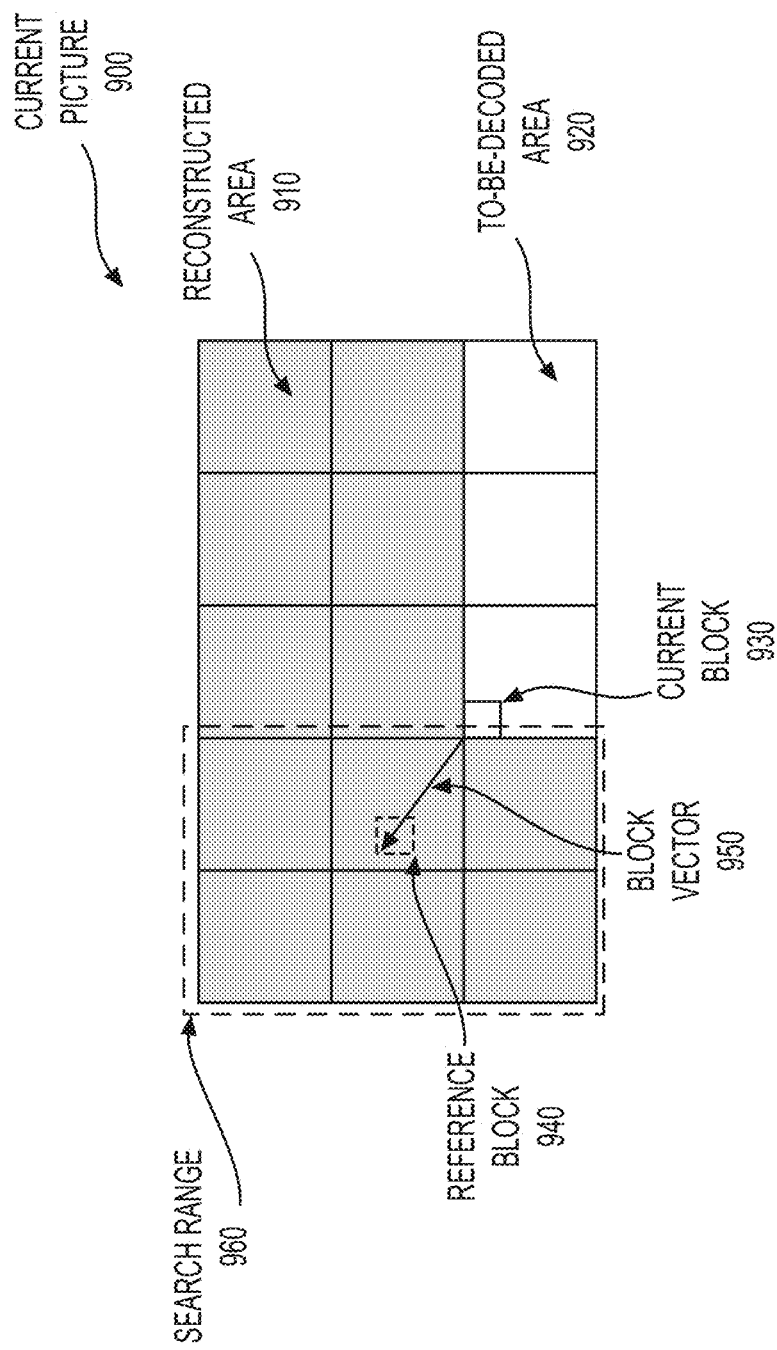
FIG. 9 shows an example of intra block copy according to an embodiment of the disclosure.

FIG. 9 shows an example of intra block copy according to an embodiment of the disclosure. A current picture (900) is to be reconstructed under decoding. The current picture (900) includes a reconstructed area (910) (grey area) and a to-be-decoded area (920) (white area). A current block (930) is under reconstruction by a decoder. The current block (930) can be reconstructed from a reference block (940) that is in the reconstructed area (910). A position offset between the reference block (940) and the current block (930) is referred to as a block vector (950) (or BV (950)). In the FIG. 9 example, a search range (960) is within the reconstructed area (910), the reference block (940) is within the search range (960), and the block vector (950) is constrained to point to the reference block (940) within the search range (960).

FIGS. 10A-10D show examples of intra block copy according to an embodiment of the disclosure. Referring to FIGS. 10A-D, a current picture (1001) includes a current CTB (1015) under reconstruction and a previously reconstructed CTB (1010) that is a left neighbor of the current CTB (1015). CTBs in the current picture (1001) have a CTB size and a CTB width. A search range can have a size of a CTU (e.g., the CTB size). A memory may be reused for searching a portion of the previously reconstructed CTB (1010). The current CTB (1015) includes 4 regions (1016)-(1019). Similarly, the previously reconstructed CTB (1010) includes 4 regions (1011)-(1014). In an embodiment, the CTB size is equal to a reference memory size. In an example, the CTB size and the reference memory size are 128 by 128 samples, and each of the regions (1011)-(1014) and (1016)-(1019) has a size of 64 by 64 samples.

In the examples illustrated in FIGS. 10A-D, the current CTB (1015) includes a top left region, a top right region, a bottom left region, and a bottom right region that correspond to the regions (1016)-(1019), respectively. The previously reconstructed CTB (1010) includes a top left region, a top right region, a bottom left region, and a bottom right region that correspond to the regions (1011)-(1014), respectively.

Figure 10A:
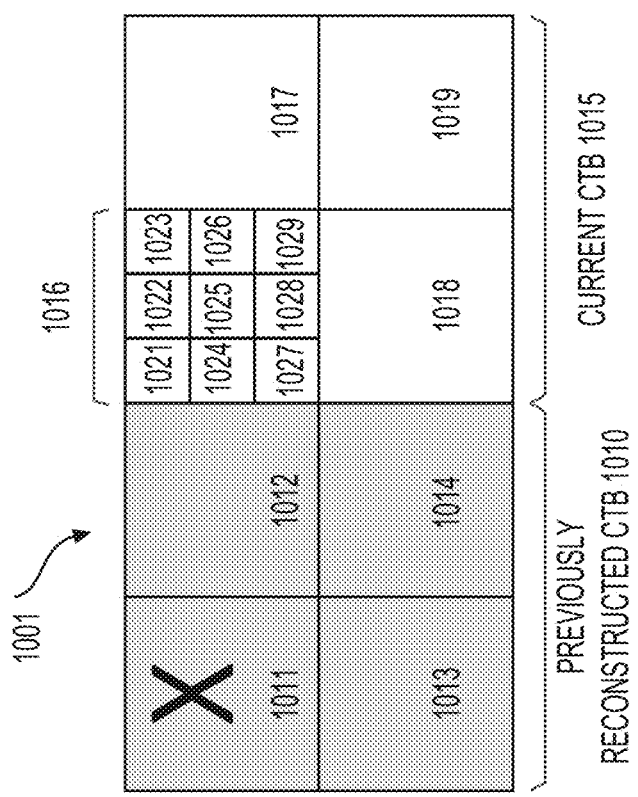

Referring to FIG. 10A, the current region (1016) is under reconstruction. The current region (1016) includes a plurality of coding blocks (1021)-(1029). The current block (1021) is to be reconstructed first in the current region (1016). The current region (1016) has a collocated region, i.e., the region (1011), in the previously reconstructed CTB (1010). According to some embodiments, a search range for the current block (1021) excludes the collocated region (1011) where the current block (1021) is to be reconstructed first in the current region (1016). Therefore, a tight synchronization and timing control of a reference memory buffer is not necessary. The search range includes the regions (1012)-(1014) of the previously reconstructed CTB (1010) that are reconstructed after the collocated region (1011) and before the current block (1021) in a decoding order.

Referring to FIG. 10A, a position of the collocated region (1011) is offset by the CTB width, such as 128 samples, from a position of the current region (1016). For example, the position of the collocated region (1011) is left shifted by 128 samples from the position of the current region (1016).

Referring again to FIG. 10A, when the current region (1016) is the top left region of the current CTB (1015), the collocated region (1011) is the top left region of the previously reconstructed CTB (1010), and the search region excludes the top left region of the previously reconstructed CTB.

Figure 10B:
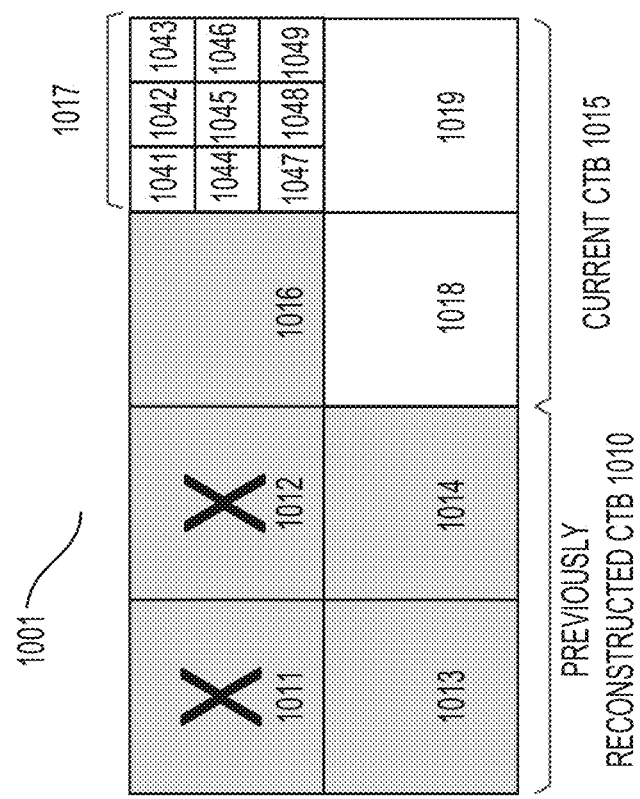

Referring to FIG. 10B, the current region (1017) is under reconstruction. The current region (1017) includes a plurality of coding blocks (1041)-(1049). The current block (1041) is to be reconstructed first in the current region (1017). The current region (1017) has a collocated region (i.e., the region (1012), in the previously reconstructed CTB (1010). According to aspects of the disclosure, a search range for the current block (1041) excludes the collocated region (1012) where the current block (1041) is to be reconstructed first in the current region (1017). Therefore, a tight synchronization and timing control of a reference memory buffer is not necessary. The search range includes the regions (1013)-(1014) of the previously reconstructed CTB (1010) and the region (1016) in the current CTB (1015) that are reconstructed after the collocated region (1012) and before the current block (1041). The search range further excludes the region (1011) due to constraint of the reference memory size (i.e., one CTB size). Similarly, a position of the collocated region (1012) is offset by the CTB width, such as 128 samples, from a position of the current region (1017).

Figure 10C:
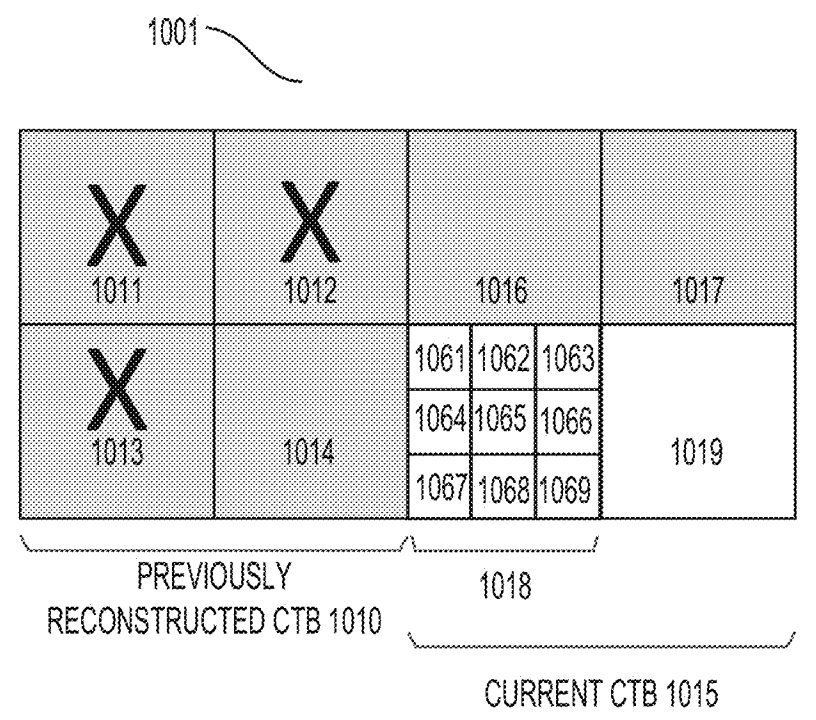

In the FIG. 10B example, the current region (1017) is the top right region of the current CTB (1015), the collocated region (1012) is also the top right region of the previously reconstructed CTB (1010), and the search region excludes the top right region of the previously reconstructed CTB (1010), Referring to FIG. 10C, the current region (1018) is under reconstruction. The current region (1018) includes a plurality of coding blocks (1061)-(1069). The current block (1061) is to be reconstructed first in the current region (1018). The current region (1018) has a collocated region (i.e., the region (1013)), in the previously reconstructed CTB (1010). According to aspects of the disclosure, a search range for the current block (1061) excludes the collocated region (1013) where the current block (1061) is to be reconstructed first in the current region (1018). Therefore, a tight synchronization and timing control of a reference memory buffer is not necessary. The search range includes the region (1014) of the previously reconstructed CTB (1010) and the regions (1016)-(1017) in the current CTB (1015) that are reconstructed after the collocated region (1013) and before the current block (1061). Similarly, the search range further excludes the regions (1011)-(1012) due to constraint of the reference memory size. A position of the collocated region (1013) is offset by the CTB width, such as 128 samples, from a position of the current region (1018). In the FIG. 10C example, when the current region (1018) is the bottom left region of the current CTB (1015), the collocated region (1013) is also the bottom left region of the previously reconstructed CTB (1010), and the search region excludes the bottom left region of the previously reconstructed CTB (1010).

Figure 10D:
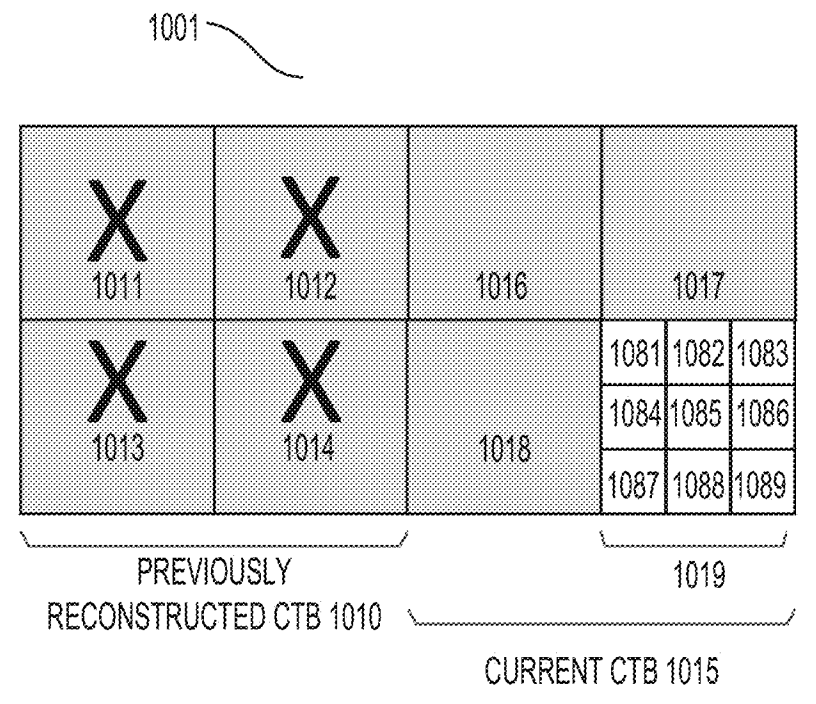

Referring to FIG. 10D, the current region (1019) is under reconstruction. The current region (1019) includes a plurality of coding blocks (1081)-(1089). The current block (1081) is to be reconstructed first in the current region (1019). The current region (1019) has a collocated region (i.e., the region (1014)), in the previously reconstructed CTB (1010). According to aspects of the disclosure, a search range for the current block (1081) excludes the collocated region (1014) where the current block (1081) is to be reconstructed first in the current region (1019). Therefore, a tight synchronization and timing control of a reference memory buffer is not necessary. The search range includes the regions (1016)-(1018) in the current CTB (1015) that are reconstructed after the collocated region (1014) and before the current block (1081) in a decoding order. The search range excludes the regions (1011)-(1013) due to constraint of the reference memory size, and thus, the search range excludes the previously reconstructed CTB (1010). Similarly, a position of the collocated region (1014) is offset by the CTB width, such as 128 samples, from a position of the current region (1019). In the FIG. 10D example, when the current region (1019) is the bottom right region of the current CTB (1015), the collocated region (1014) is also the bottom right region of the previously reconstructed CTB (1010) and the search region excludes the bottom right region of the previously reconstructed CTB (1010).

Figure 1A:
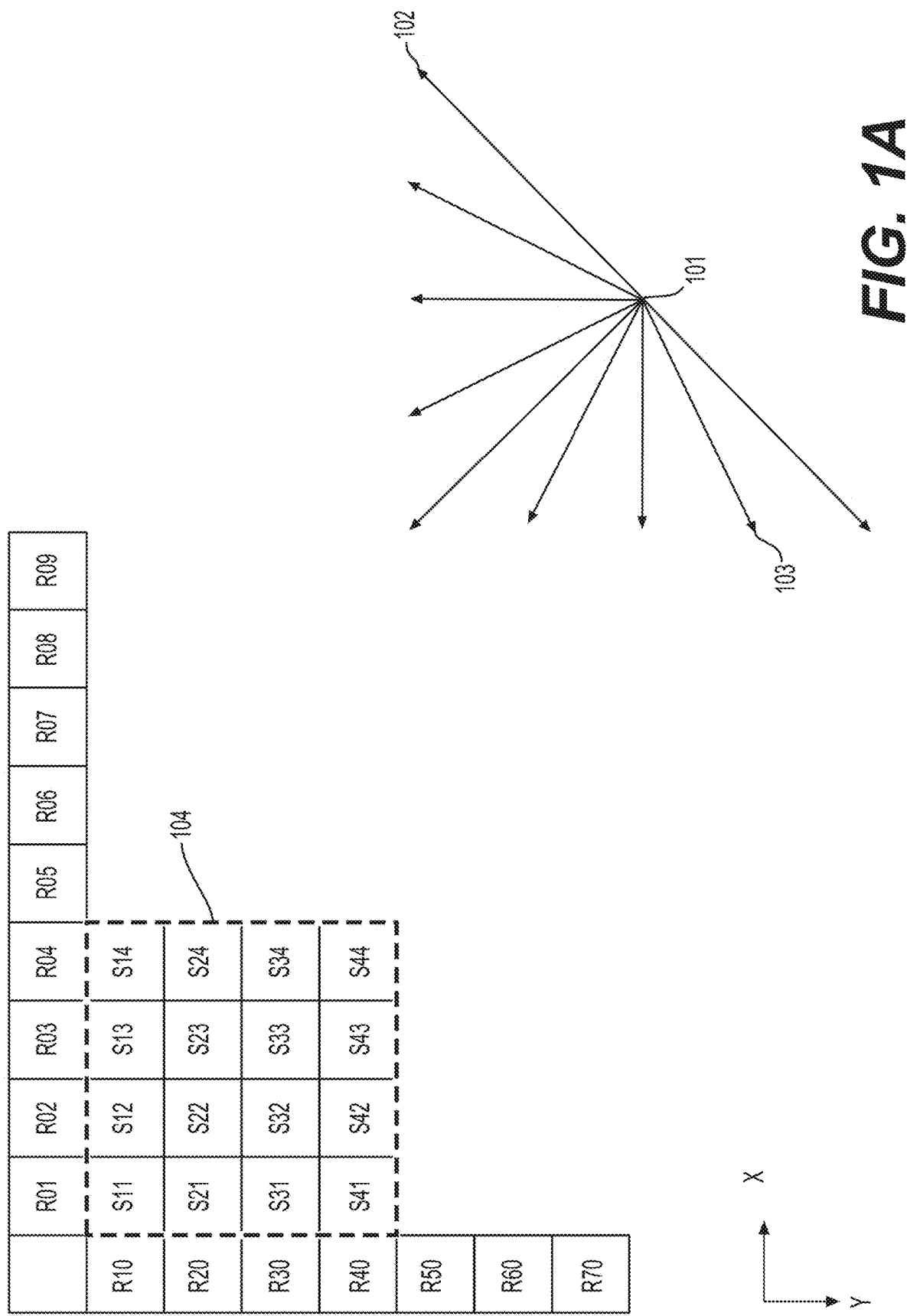
FIG. 1A is a schematic illustration of an exemplary subset of intra prediction modes.
Figure 1B:
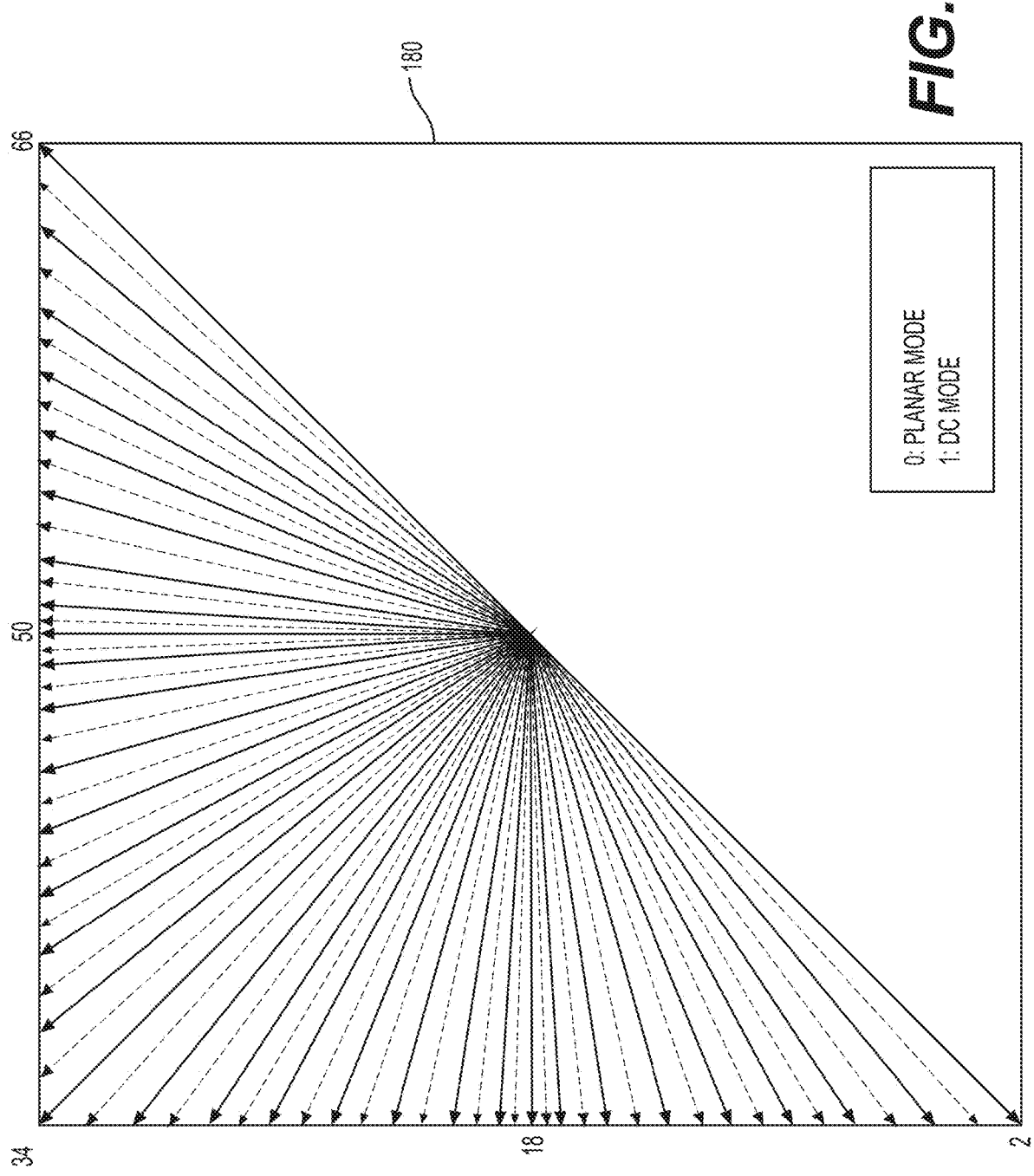
FIG. 1B is an illustration of exemplary intra prediction directions.
Figure 2:
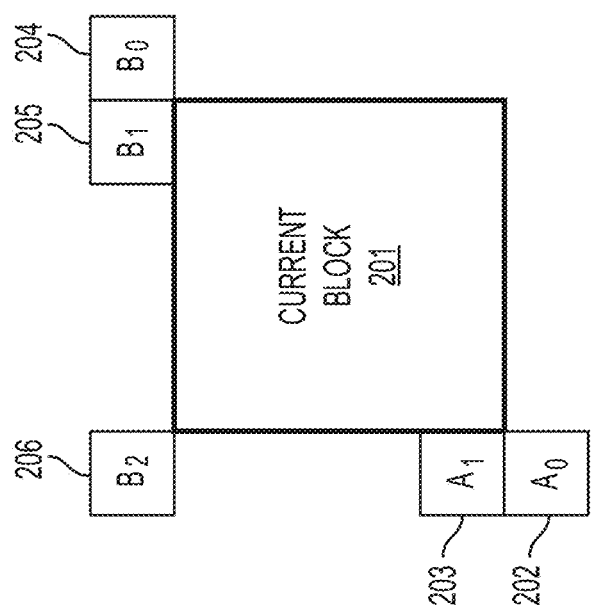
FIG. 2 is a schematic illustration of a current block and its surrounding spatial merge candidates in one example.

Some variations for the intra block copy can include treating the intra block copy as a third mode, which is different from the intra prediction mode and the inter prediction mode. By treating the intra block copy as the third mode, the BV prediction in a merge mode (or IBC merge mode) and an AMVP mode (or IBC AMVP mode) can be separated from a regular inter mode. For example, a separate merge candidate list (or an IBC merge candidate list) is defined for the IBC mode where each entry in the separate merge candidate list is a BV. Similarly, a BV prediction candidate list in the IBC AMVP mode only includes BV(s). Some general rules applied to the IBC merge candidate list and the BV prediction candidate list can include: the IBC merge candidate list and the BV prediction candidate list can follow the same logic as the inter merge candidate list or the BV prediction candidate list in terms of candidate derivation process. For example, the five spatial neighboring locations (e.g., 202-206 in FIG. 2) in the inter merge mode (e.g., HEVC or VVC) are accessed for the intra block copy to derive a merge candidate list for the IBC mode.

In an example, hen a bit-rate is high or for certain content(s), it may be useful not to perform loop filter(s) for regions or boundaries coded with screen content coding tool(s). Accordingly, the loop filter(s) can be disabled or conditionally disabled.

The SCC tools can further include a transform skip (IS) mode, a block differential pulse coded modulation (BDPCM) mode, and the like that can be suitable for screen content materials.

The BDPCM mode can be used for screen content coding. At the sequence level, a BDPCM enable flag can be signalled in the SPS. In an example, the BDPCM enable flag is signalled only if the TS mode is enabled in the SPS.

When the BDPCM mode is enabled, a flag can be transmitted at the CU level if the CU size is smaller than or equal to MaxTsSize by MaxTsSize in terms of luma samples and if the CU is intra coded, where MaxTsSize is the maximum block size for which the TS mode is allowed. The flag can indicate whether a regular intra coding or the BDPCM mode is used. If the BDPCM mode is used, a BDPCM prediction direction flag can be transmitted to indicate whether the prediction is horizontal or vertical. Then, the block can be predicted using the regular horizontal or vertical intra prediction process with unfiltered reference samples. The residual can be quantized and the difference between each quantized residual and a corresponding predictor, e.g., the previously coded residual of the horizontal or vertical (depending on the BDPCM prediction direction) neighbouring position, can be coded.

For a block of size M (height)×N (width), let $r_{i,j}$, $0 \leq i \leq M-1$, $0 \leq j \leq N-1$ be the prediction residual. Let $Q(r_{i,j})$, $0 \leq i \leq M-1$, $0 \leq j \leq N-1$ denote the quantized version of the residual $r_{i,j}$. The BDPCM mode can be applied to the quantized residual values, resulting in a modified M×N array $\tilde{R}$ with elements $\tilde{r}_{i,j}$, where $\tilde{r}_{i,j}$ is predicted from its neighboring quantized residual value. For a vertical BDPCM prediction mode, for $0 \leq j \leq (N-1)$, the following can be used to derive $\tilde{r}_{i,j}$:

$$\tilde{r}_{i,j} = \begin{cases} Q(r_{i,j}), & i = 0 \\ Q(r_{i,j}) - Q(r_{(i-1),j}), & 1 \leq i \leq (M-1) \end{cases} \quad (1)$$

For a horizontal BDPCM prediction mode, for $0 \leq i \leq (M-1)$, the following can be used to derive $\tilde{r}_{i,j}$:

$$\tilde{r}_{i,j} = \begin{cases} Q(r_{i,j}), & j = 0 \\ Q(r_{i,j}) - Q(r_{i,(j-1)}), & 1 \leq j \leq (N-1) \end{cases} \quad (2)$$

At the decoder side, the above process can be reversed to compute $(r_{i,j})$, $0 \leq i \leq M-1$, $0 \leq j \leq N-1$, as follows:

$$Q(r_{i,j}) = \Sigma_{k=0}^{i} \tilde{r}_{k,j}, \text{ if the vertical BDPCM mode is used} \quad (3)$$

$$Q(r_{i,j}) = \Sigma_{k=0}^{j} \tilde{r}_{i,k}, \text{ if the horizontal BDPCM mode is used} \quad (4)$$

The inverse quantized residuals, $Q^{-1}(Q(r_{i,j}))$, are added to the intra block prediction values to produce the reconstructed sample values.

The predicted quantized residual values $\tilde{r}_{i,j}$ can be sent to the decoder using the same residual coding process as that in the TS mode residual coding. For a lossless coding, if slice_ts_residual_coding_disabled_flag is set to 1, the quantized residual values can be sent to the decoder using regular transform residual coding. In terms of the MPM mode for an intra mode coding, a horizontal or a vertical prediction mode can be stored for a BDPCM-coded CU if the BDPCM prediction direction is horizontal or vertical, respectively. For deblocking, if both blocks on the sides of a block boundary are coded using the BDPCM mode, the block boundary may not be de-blocked.

The TS mode can be used for luma blocks of size up to MaxTsSize by MaxTsSize, where the value of MaxTsSize can be signaled in the PPS and can be 32 or less. When a CU is coded in the TS mode, a prediction residual can be quantized and coded using the transform skip residual coding process. The transform skip residual coding process can be modified from a transform coefficient coding process. In the transform skip mode, the residuals of a TU can be coded in units of non-overlapped subblocks of size 4×4. For better coding efficiency, some modifications can be made to customize the residual coding process towards the residual signal's characteristics. The following summarizes some differences between the transform skip residual coding and a regular transform residual coding: (i) forward scanning order is applied to scan the subblocks within a transform block and also the positions within a subblock; (ii) no signaling of the last (x, y) position; (iii) coded_sub_block_flag can be coded for every subblock except for the last subblock when all previous flags are equal to 0; (iv) sig_coeff_flag context modelling uses a reduced template, and context model of sig_coeff_flag depends on top and left neighboring values; (v) context model of abs_level_gt1 flag also depends on the left and top sig_coeff_flag values; (vi) par_level_flag using only one context model; (vii) additional greater than 3, 5, 7, 9 flags can be signaled to indicate the coefficient level, one context for each flag; (viii) rice parameter derivation using fixed order=1 for the binarization of the remainder values; and (ix) context model of the sign flag is determined based on left and above neighboring values and the sign flag is parsed after sig_coeff_flag to keep all context coded bins together.

For each subblock, if the coded_subblock_flag is equal to 1 (e.g., there is at least one non-zero quantized residual in the subblock), coding of the quantized residual levels is performed in three scan passes. In a first scan pass, a significance flag (e.g., sig_coeff_flag), a sign flag (e.g., coeff_sign_flag), an absolute level greater than 1 flag (e.g., abs_level_gtx_flag[0]), and a parity (e.g., par_level_flag) can be coded. For a given scan position, if sig_coeff_flag is equal to 1, then coeff_sign_flag is coded, followed by the abs_level_gtx_flag[0] (which specifies whether the absolute level is greater than 1). If abs_level_gtx_flag[0] is equal to 1, then the par_level_flag is additionally coded to specify the parity of the absolute level. In a greater-than-x scan pass, for each scan position whose absolute level is greater than 1, up to four abs_level_gtx_flag[i] for i=1 . . . 4 can be coded to indicate if the absolute level at the given position is greater than 3, 5, 7, or 9, respectively. In a remainder scan pass, the remainder of the absolute level abs_remainder can be coded in a bypass mode. The remainder of the absolute levels can be binarized using a fixed rice parameter value of 1.

The bins in the first two scan passes (e.g., the first scan pass and the greater-than-x scan pass) can be context coded until the maximum number of context coded bins in the TU is exhausted. The maximum number of context coded bins in a residual block can be limited to 1.75*block_width*block_height, or equivalently, 1.75 context coded bins per sample position on average. The bins in the last scan pass (e.g., the remainder scan pass) are bypass coded. A variable, RemCcbs, is first set to the maximum number of context-coded bins for the block and is decreased by one each time a context-coded bin is coded. While RemCcbs is larger than or equal to four, syntax elements in the first coding pass, which includes the sig_coeff_flag, coeff_sign_flag, abs_level_gt1_flag and par_level_flag, are coded using context-coded bins. If RemCcbs becomes smaller than 4 while coding the first pass, the remaining coefficients that have yet to be coded in the first pass are coded in the remainder scan pass.

After completion of first pass coding, if RemCcbs is larger than or equal to four, syntax elements in the second coding pass, which includes abs_level_gt3_flag, abs_level_gt5_flag, abs_level_gt7_flag, and abs_level_gt9_flag, are coded using context coded. bins. If the RemCcbs becomes smaller than 4 while coding the second pass, the remaining coefficients that have yet to be coded in the second pass are coded in the remainder scan pass.

Figure 11:
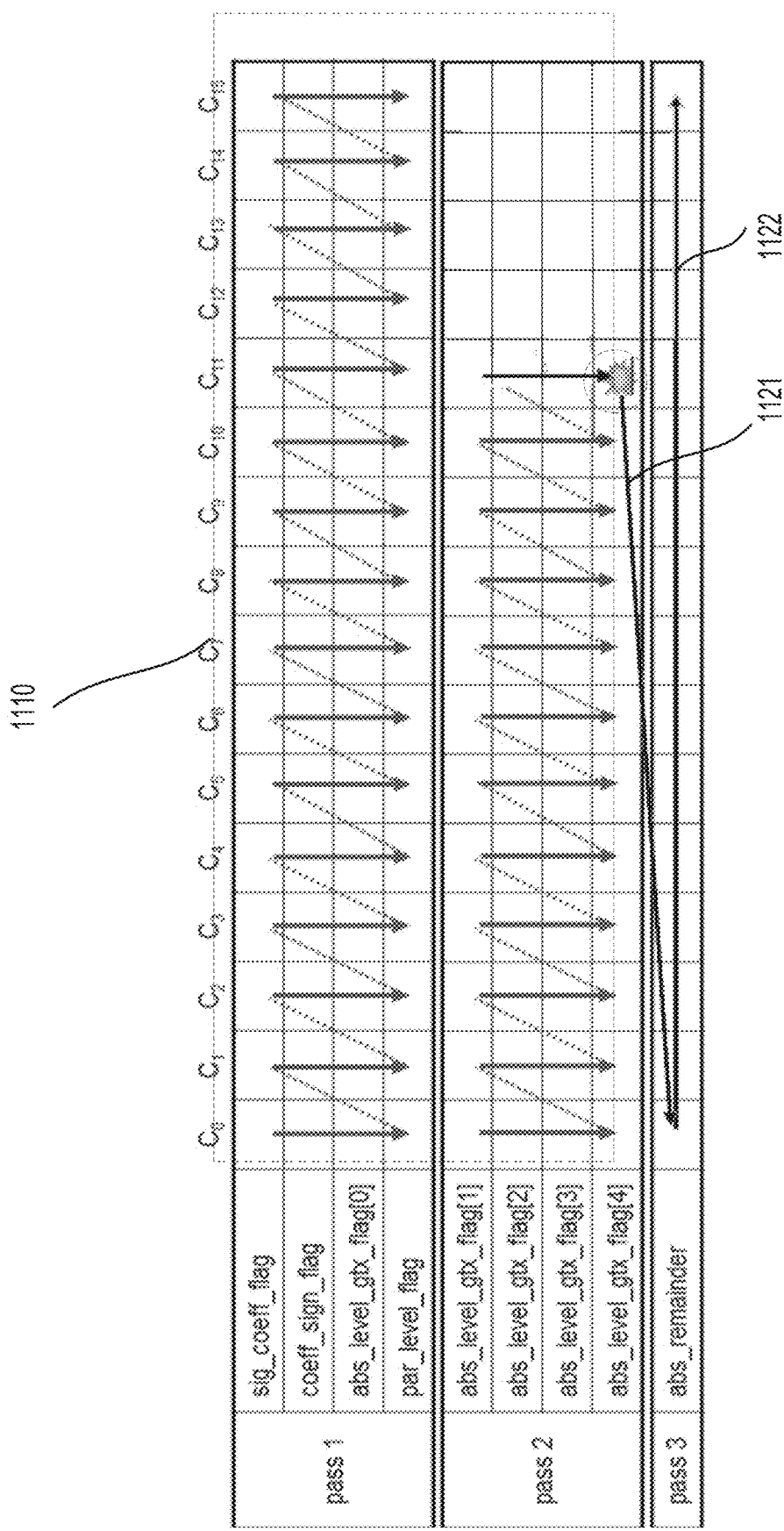
FIG. 11 illustrates an example of the transform skip residual coding process according to an embodiment of the disclosure.

FIG. 11 illustrates an example of the transform skip residual coding process according to an embodiment of the disclosure. A star shape (1122) marks the position when context coded bins are exhausted, at which point all remaining bins are coded using bypass coding as indicated by arrows (1121)-(1122). Arrows in a square (1110) indicate context coding.

Further, for a block not coded in the BDPCM mode, a level mapping mechanism can be applied to the transform skip residual coding until the maximum number of context coded bins is reached. Level mapping can use the top and left neighboring coefficient levels to predict the current coefficient level in order to reduce a signaling cost. For a given residual position, absCoeff can represent the absolute coefficient level before mapping and absCoeffMod can represent the coefficient level after mapping. Let $X_0$ denote the absolute coefficient level of the left neighbouring position and let $X_1$ denote the absolute coefficient level of the above neighbouring position, the level mapping is performed as follows:

```
pred = max(X0, X1);
if (absCoeff = = pred)
    absCoeffMod = 1;
else
    absCoeffMod = (absCoeff < pred) ? absCoeff + 1 : absCoeff.
```

Then, the absCoeffMod value can be coded as described above. After all context coded bins have been exhausted, a level mapping can be disabled for all remaining scan positions in the current block.

In some embodiments, deblocking filter techniques can be used. In an example (e.g., HEVC), a deblocking filtering process is performed for each CU in the same order as the decoding process. For example, edges (or boundaries) of a CU can be respectively filtered. In an example, vertical edges are first filtered (horizontal filtering) and then horizontal edges are filtered (vertical filtering). In some examples, filtering may be applied to the 8×8 block boundaries both for luma and chroma components; 4×4 block boundaries may not be processed in order to reduce the complexity. A boundary strength (Bs) can be used to indicate a degree or strength of a deblocking filtering process that may be used for a boundary. In an embodiment, a value of 2 for Bs indicates strong filtering, a value of 1 indicates weak filtering, and a value of 0 indicates no deblocking filtering.

In an embodiment, Bs is calculated on a 4×4 sample grid basis, but can be re-mapped to an 8×8 sample grid. In an example, an 8×8 block includes four 4×4 blocks, so a boundary of the 8×8 block includes two sides of two adjacent 4×4 blocks. The maximum of the two values of Bs which correspond to 8 pixels forming a line in the 4×4 grid can be selected as the Bs for boundaries in the 8×8 grid.

Figure 12:
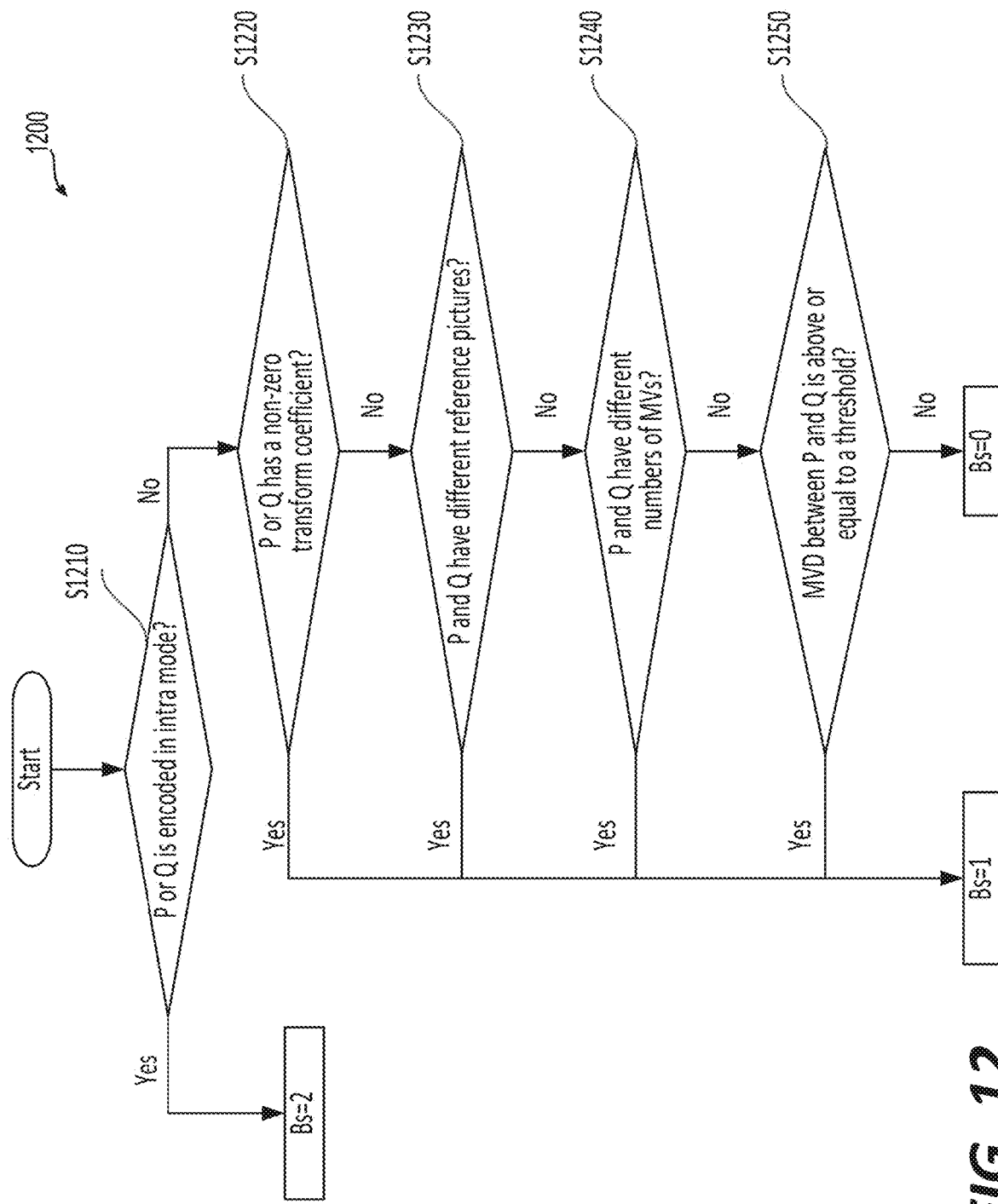
FIG. 12 shows a flow chart of an exemplary process (1200) for determining a boundary strength value according to an embodiment of the disclosure.

FIG. 12 shows a flow chart of an exemplary process (1200) for determining a Bs value according to an embodiment of the disclosure. It is noted that the order of the steps in FIG. 12 can be reordered or one or more steps omitted in other embodiments.

In FIG. 12, P and Q are two adjacent blocks with a boundary between them. In a vertical edge case, P can represent a block located to the left of the boundary and Q can represent a block located to the right of the boundary. In a horizontal edge case, P can represent a block located above the boundary and Q can represent a block located below the boundary.

As shown in FIG. 12, a Bs value can be determined based on a prediction mode (e.g., intra coding mode), a non-zero transform coefficient (e.g., existence of non-zero transform coefficients), a reference picture, a number of motion vectors, and a motion vector difference.

At step (S1210), the process (1200) determines whether P or Q is coded in an intra prediction mode. When at least one of P and Q is determined to be coded in the intra prediction mode, the process (1200) determines a first value (e.g., 2) for the Bs. Otherwise, the process (1200) proceeds to step (S1220).

At step (S1220), the process (1200) determines whether P or Q has a non-zero transform coefficient. When at least one of P and Q is determined to have a non-zero transform coefficient, the process (1200) determines a second value (e.g., 1) for the Bs. Otherwise, the process (1200) proceeds to step (S1230).

At step (S1230), the process (1200) determines whether P and Q have different reference pictures. When P and Q are determined to have different reference pictures, the process (1200) determines a third value (e.g., 1) for the Bs. Otherwise, the process (1200) proceeds to step (S1240).

At step (S1240), the process (1200) determines whether P and Q have different numbers of motion vectors. When P and Q are determined to have different numbers of motion vectors, the process (1200) determines a fourth value (e.g., 1) for the Bs. Otherwise, the process (1200) proceeds to step (S1250).

At step (S1250), the process (1200) determines whether a motion vector difference between P and Q is above or equal to a threshold T. When the motion vector difference between P and Q is determined to be above or equal to the threshold T, the process (1200) determines a fifth value (e.g., 1) for the Bs. Otherwise, the process (1200) determines a sixth value (e.g., 0) for the Bs. In an embodiment, the threshold T is set to 1 pixel. In an example, the MV precision is ¼ pixel and a value of the MV difference threshold can be set to 4. In another example, the MV precision is 1/16 and the value of the MV difference can be set to 16.

The above deblocking filtering process may be modified in some examples, such as the VTM5. In some embodiments, one or more of the following modifications can be made: (1) the filter strength of the deblocking filter can be dependent of the averaged luma level of the reconstructed samples; (2) deblocking tC table can be extended; (3) stronger deblocking filter may be used for luma; (4) stronger deblocking filter may be used for chroma; (5) different deblocking grids may be used for luma and chroma, for example, luma deblocking is performed on 4×4 sample grid, and chroma deblocking is performed on 8×8 sample grid.

Specifically, in an embodiment, the filter strength is dependent on reconstructed average luma level. In some examples (e.g., HEVC), the filter strength of the deblocking filter is controlled by the variables β and $t_C$ which are derived from the averaged quantization parameters $qP_L$. In the VTM5 in an example, the strength of the deblocking filter is also controlled by an offset to $qP_L$, the offset is set according to the luma level of the reconstructed samples. The reconstructed luma level LL can be derived as (Eq. 5):

$$LL = ((p_{0,0} + p_{0,3} + p_{0,0} + p_{0,3}) >> 2)/(1 << bitDepth) \quad (5)$$

where, the sample values $p_{i,k}$ and $q_{i,k}$ with i=0 . . . 3 and k=0 and 3 are derived based on sample positions.

Figure 13:
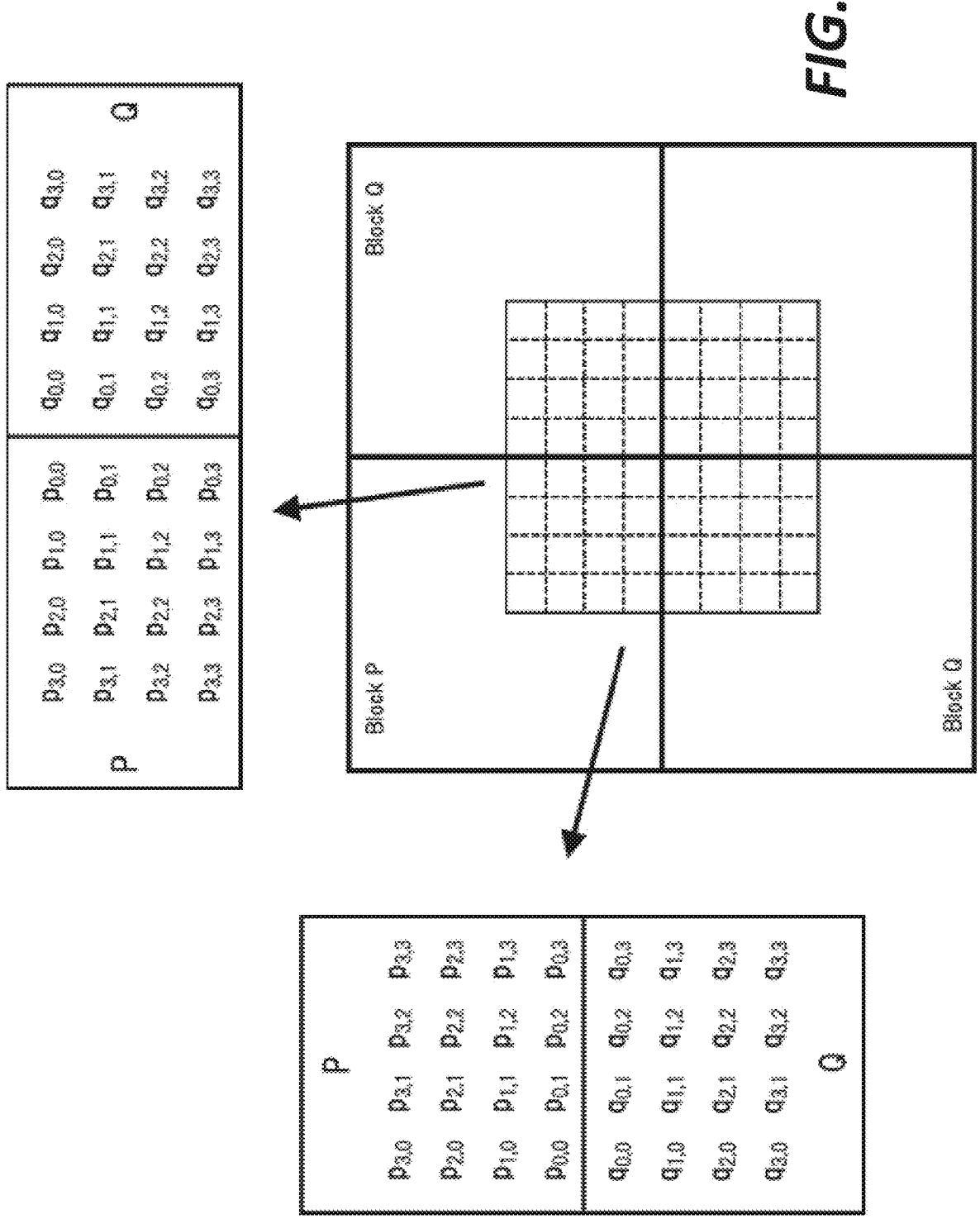
FIG. 13 shows an example of a deblocking, filtering process according to some embodiments of the disclosure.

FIG. 13 shows an example to derive $p_{i,k}$ and $q_{i,k}$ with i=0 . . . 3 and k=0 and 3.

In an example, the variable $qP_L$ is derived as (Eq. 6):

$$qP_L = ((Qp_Q + Qp_P + 1) >> 1) \times qpOffset \quad (6)$$

where $Qp_Q$ and $Qp_P$ denote the quantization parameters of the coding units containing the sample $q_{0,0}$ and $p_{0,0}$, respectively. The offset qpOffset is dependent on transfer function, the values are signaled in the SPS.

In an embodiment, the deblocking tC table can be extended. For example, in VTM5, maximum QP can be changed from 51 to 63. The values of deblocking parameters tC are derived based on the block QP, thus accordingly the deblocking table is changed. Following is an updated tC table to accommodate the extension of the QP range:

tC=[0, 0, 0, 0, 0, 0, 0, 0, 0, 0, 0, 0, 0, 0, 0, 0, 0, 0, 1, 1, 1, 1, 1, 1, 1, 1, 1, 2, 2, 2, 2, 3, 3, 3, 3, 4, 4, 4, 5, 5, 6, 6, 7, 8, 9, 10, 11, 13, 14, 16, 18, 20, 22, 25, 28, 31, 35, 39, 44, 50, 56, 63, 70, 79, 88, 99].

In an embodiment, a stronger deblocking filter for luma can be used. In some examples, a bilinear filter (an example of a stronger deblocking filter) is used when samples at either side of a boundary belong to a large block. A sample belonging to a large block is defined as when the width of the block is larger than or equal to 32 for a vertical boundary, and when the height of the block is larger than or equal to 32 for a horizontal boundary. Block boundary samples $p_i$ for i=0 to Sp-1 and $q_i$ for j=0 to Sq-1 are then replaced by linear interpolation as follows:

$$p_i' = (f_i \times Middle_{s,t} + (64 - f_i) \times P_s + 32) >> 6), \text{ clipped to } p_i \pm tcPD_i \quad (7)$$

$$q_j' = (g_j \times Middle_{s,t} + (64 - g_j) \times Q_s + 32) >> 6), \text{ clipped to } q_j \pm tcPD_j \quad (8)$$

where $tcPD_i$ and $tcPD_j$ term is a position dependent clipping and $g_j$, $f_i$, $Middle_{s,t}$, $P_s$ and $Q_s$ are given based on following Table 1:

TABLE 1

Derivation of Stronger Deblocking Parameters for Luma

| Sp, Sq | |
|---|---|
| 7, 7 (p side: 7, q side: 7) | $f_i = 59 - i \times 9$, can also be described as f = {59, 50, 41, 32, 23, 14, 5} <br> $g_j = 59 - j \times 9$, can also be described as g = {59, 50, 41, 32, 23, 14, 5} <br> $Middle_{7,7} = (2 \times (p_0 + q_0) + p_1 + q_1 + p_2 + q_2 + p_3 + q_3 + p_4 + q_4 + p_5 + q_5 + p_6 + q_6 + 8) >> 4$ <br> $P_7 = (p_6 + p_7 + 1) >> 1$, $Q_7 = (q_6 + q_7 + 1) >> 1$ |
| 7, 3 (p side: 7, q side: 3) | $f_i = 59 - i \times 9$, can also be described as f = {59, 50, 41, 32, 23, 14, 5} <br> $g_j = 53 - j \times 21$, can also be described as g = {53, 32, 11} <br> $Middle_{7,3} = (2 \times (p_0 + q_0) + q_0 + 2 \times (q_1 + q_2) + p_1 + q_1 + p_2 + p_3 + p_4 + p_5 + p_6 + 8) >> 4$ <br> $P_7 = (p_6 + p_7 + 1) >> 1$, $Q_3 = (q_2 + q_3 + 1) >> 1$ |
| 3, 7 (p side: 3, q side: 7) | $g_j = 59 - j \times 9$, can also be described as g = {59, 50, 41, 32, 23, 14, 5} <br> $f_i = 53 - i \times 21$, can also be described as f = {53, 32, 11} <br> $Middle_{3,7} = (2 \times (q_0 + p_0) + p_0 + 2 \times (p_1 + p_2) + q_1 + p_1 + q_2 + q_3 + q_4 + q_5 + (q_6 + 8) >> 4$ <br> $Q_7 = (q_6 + q_7 + 1) >> 1$, $P_3 = (p_2 + p_3 + 1) >> 1$ |
| 7, 5 (p side: 7, q side: 5) | $g_j = 58 - j \times 13$, can also be described as g = {58, 45, 32, 19, 6} <br> $f_i = 59 - i \times 9$, can also be described as f = {59, 50, 41, 32, 23, 14, 5} <br> $Middle7, 5 = (2 \times (p_0 + q_0 + p_1 + q_1) + q_2 + p_2 + q_3 + p_3 + q_4 + p_4 + q_5 + p_5 + 8) >> 4$ <br> $Q_5 = (q_4 + q_5 + 1) >> 1$, $P_7 = (p_6 + p_7 + 1) >> 1$ |
| 5, 7 (p side: 5, q side: 7) | $g_j = 59 - j \times 9$, can also be described as g = {59, 50, 41, 32, 23, 14, 5} <br> $f_i = 58 - i \times 13$, can also be described as f = {58, 45, 32, 19, 6} <br> $Middle5, 7 = (2 \times (q_0 + p_0 + p_1 + q_1) + q_2 + p_2 + q_3 + p_3 + q_4 + p_4 + q_5 + p_5 + 8) >> 4$ <br> $Q_7 = (q_6 + q_7 + 1) >> 1$, $P_5 = (p_4 + p_5 + 1) >> 1$ |
| 5, 5 (p side: 5, q side: 5) | $g_j = 58 - j \times 13$, can also be described as g = {58, 45, 32, 19, 6} <br> $f_i = 58 - i \times 13$, can also be described as f = {58, 45, 32, 19, 6} <br> $Middle5, 5 = (2 \times (q_0 + p_0 + p_1 + q_1 + q_2 + p_2) + q_3 + p_3 + q_4 + p_4 + 8) >> 4$ <br> $Q_5 = (q_4 + q_5 + 1) >> 1$, $P_5 = (p_4 + p_5 + 1) >> 1$ |

TABLE 1-continued

Derivation of Stronger Deblocking Parameters for Luma

| | |
|---|---|
| 5, 3 (p side: 5 q side: 3) | $g_j = 53 - j \times 21$, can also be described as g = {53, 32, 11} $f_i = 58 - i \times 13$, can also be described as f = {58, 45, 32, 19, 6} Middle5, 3 = $(q_0 + p_0 + p_1 + q_1 + q_2 + p_2 + q_3 + p_3 + 4) >> 3$ $Q_3 = (q_2 + q_3 + 1) >> 1$, $P_5 = (p_4 + p_5 + 1) >> 1$ |
| 3, 5 (p side: 3 q side: 5) | $g_j = 58 - j \times 13$, can also be described as g = {58, 45, 32, 19, 6} $f_i = 53 - i \times 21$, can also be described as f = {53, 32, 11} Middle3, 5 = $(q_0 + p_0 + p_1 + q_1 + q_2 + p_2 + q_3 + p_3 + 4) >> 3$ $Q_5 = (q_4 + q_5 + 1) >> 1$, $P_3 = (p_2 + p_3 + 1) >> 1$ |

In some embodiments, the above mentioned stronger luma filters are used only if all of three conditions (referred to as Condition1, Condition2 and Condition3) are TRUE. Condition1 is a "large block condition". Condition1 detects whether the samples at P-side and Q-side belong to large blocks. Condition2 and Condition3 are determined by:

$$\text{Condition2} = (d<\beta) \text{ ? TRUE:FALSE} \qquad (9)$$

$$\text{Condition3} = \text{StrongFilterCondition} = (dpq \text{ is less than } (\beta>>2), sp_3+sq_3 \text{ is less than } (3 \times \beta>>5), \text{ and Abs } (p_0-q_0) \text{ is less than } (5 \times t_C+1)>>1) \text{ ? TRUE:FALSE} \qquad (Eq. 10)$$

In an embodiment, strong deblocking filter is used for chroma, In an example, the strong deblocking filter for chroma. can be defined as shown in (Eq. 10-Eq. 12)

$$p_2' = (3 \times p_3 + 2 \times p_2 + p_1 + p_0 + q_0 + 4) >> 3 \qquad (10)$$

$$p_1' = (2 \times p_3 + p_2 + 2 \times p_1 + p_0 + q_0 + q_1 + 4) >> 3 \qquad (11)$$

$$p_0' = (p_3 + p_2 + p_1 + 2 \times p_0 + q_0 + q_1 + q_2 + 4) >> 3 \qquad (12)$$

The above chroma filter performs deblocking on an 8×8 chroma sample grid. The chroma strong filters are used on both sides of the block boundary. In an example, the chroma filter is selected when both sides of the chroma edge are greater than or equal to 8 (in unit of chroma sample), and the following decision with three conditions are satisfied. The first condition is for decision of boundary strength as well as large block. The second condition and third condition are basically the same as for HEVC luma decision, which are on/off decision and strong filter decision, respectively. In the first decision, boundary strength (Bs) is modified for chroma filtering as shown in Table 2. The conditions in Table 2 can be checked sequentially. If a condition is satisfied, then the remaining conditions with lower priorities can be skipped in some examples.

TABLE 2

The Modified Boundary Strength

| Priority | Conditions | Y | U | V |
|---|---|---|---|---|
| 2 | At least one of the adjacent blocks is intra | 2 | 2 | 2 |
| 4 | At least one of the adjacent blocks has on-zero transform coefficients | 1 | 1 | 1 |
| 3 | Absolute difference between the motion vectors that belong to the adjacent blocks is greater than or equal to one integer luma sample | 1 | N/A | N/A |
| 2 | Motion prediction in the adjacent blocks refers to vectors is different | 1 | N/A | N/A |
| 1 | Otherwise | 0 | 0 | 0 |

Chroma deblocking is performing when Bs is equal to 2, or Bs is equal to 1 when a large block boundary is detected. The second and third condition can be the same as HEVC luma strong filter decision.

In an embodiment, deblocking filter for sub block boundary is used. In some examples, deblocking filter is enabled on a 4×4 grid for luma, and an 8×8 grid for chroma. In some examples, a deblocking filter is enabled on an 8×8 grid for PU. In some embodiments, the deblocking filtering process is applied to the CU boundaries as well as the sub block boundaries.

In an example, when a bit-rate is high or for certain content(s), it may be useful not to perform loop filter(s) for regions or boundaries coded with screen content coding tool(s), for example, to improve coding efficiency. In some examples, characteristics of a picture including screen content can be relatively different from those of a picture (e.g., a picture taken by a camera) of a natural scene. Accordingly, certain loop filters (e.g., a DBF, a SAO filter, and/or the like) that can improve picture quality for pictures (e.g., pictures of natural scenes) having certain characteristics may not be suitable for pictures including certain screen content. In an example, the DBF may smooth edges caused by block partitions, such as in HEVC or VVC, and thus improve video quality. However, the smoothing effect of the DBF may be detrimental to or minimally effective for pictures including certain screen content. Accordingly, the loop filter(s) can be disabled or conditionally disabled to improve coding efficiency.

According to aspects of the disclosure, at least one loop filter can include but is not limited to one or a combination of: a deblocking filter (DBF), an adaptive loop filter (ALF), a sample adaptive offset (SAO) filter, a bi-lateral filter, and the like. At least one SCC tool can include but is not limited to one or a combination of: an IBC mode, a palette coding mode, a BDPCM mode, a TS mode, and the like. A high level can include one of: a sequence level, a picture level, a slice level, a tile level, a tile group level, a sub-picture level that is, for example, similar to a tile or a tile group. A high-level flag (e.g., a high-level control flag) can include but is not limited to a flag signaled in one or a combination of levels: a SPS, a PPS, a picture header, a slice header, a tile, a tile group, and the sub-picture level.

According to aspects of the disclosure, a first block (e.g., a coding block) can be coded using the palette coding mode, and thus can be referred to as a palette coded block. When a second block is to be intra predicted and uses the palette coded block (or the first block) to construct an intra mode prediction, a corresponding intra prediction mode (e.g., a horizontal mode, a vertical mode, or the like) can be assigned to the palette coded block (or the first block) for the second block to use. In an example, instead of a single default intra prediction mode, the corresponding intra prediction mode is selected from a plurality of intra prediction modes, and thus may be better suited to intra-predict the second block and improve coding efficiency for the second block. In some examples, the horizontal intra prediction mode and the vertical intra prediction mode are easier to construct than some other intra prediction mode(s), and thus can improve coding efficiency. The first block can be a reference block of the second block. The first block can be a neighboring block (e.g., a spatial neighboring block) of the second block. The first block can be a collocated block (e.g., a collocated luma block) of the second block (e.g., a chroma block). The second block can be a neighboring block (e.g., a spatial neighboring block) of the palette coded block. The second block can be a collocated block (e.g., a collocated chroma block) of the palette coded block (e.g., a luma block).

The corresponding intra prediction mode assigned for the palette code block can be the horizontal mode. When the second block uses the palette coded block, for example, as a reference block, to construct the intra mode prediction, the horizontal mode can be considered for the palette coded block. In an example, the second block is a neighboring luma block of the first block and a most probable mode (MPM) list is constructed for the second block. The second block can use the horizontal mode assigned to the first block as a reference to construct the MPM list. In an example, in a dual-tree case, the second block is a chroma block coded in the DM mode (e.g., one of the intra prediction modes) and is collocated with the first block (e.g., a collocated luma block of the second block). Thus, an actual intra prediction mode applied to the second block can be derived from the horizontal mode assigned to the first block (e.g., the collocated luma block). The collocated luma block may refer to a center position of a collocated luma position of the chroma block.

The corresponding intra prediction mode assigned for the palette code block can be the vertical mode. When the second block uses the palette coded block, for example, as a reference block, to construct the intra mode prediction, the vertical mode can be considered for the palette coded block. In an example, the second block is a neighboring luma block of the first block and a MPM list is constructed for the second block. The second block can use the vertical mode assigned to the first block as a reference to construct the MPM list. In an example, in a dual-tree case, the second block is a chroma block coded in the DM mode (e.g., one of the intra prediction modes) and is collocated with the first block (e.g., a collocated luma block of the second block). Thus, an actual intra prediction mode applied to the second block can be derived from the vertical mode assigned to the first block (e.g., the collocated luma block). The collocated luma block may refer to a center position of a collocated luma position of the chroma block.

At least one loop filter (e.g., a DBF, a SAO filter, an ALF, a bi-lateral filter, and/or the like) associated with a block can be disabled (or disallowed) for the block coded with a SCC tool (e.g., the IBC mode, the palette coding mode, the BDPCM mode, the TS mode, or the like). In some examples, the at least one loop filter (e.g., a DBF, and/or the like) can be disabled for a boundary between the block coded with the SCC tool and another block. In an example, the block is coded with the palette coding mode or the IBC mode. The block coded with the palette coding mode can be referred to as the palette coded block, and the block coded with the IBC mode can be referred to as the IBC coded block. In an example, whether the at least one loop filter associated with the current block is disabled can be determined based on at least one of a prediction mode (e.g., the palette coding mode, the IBC mode, or another SCC tool) of the block and a first quantization parameter (QP) of the block.

In an embodiment, for the block that is coded with the palette coding mode or the IBC mode, a DBF across a boundary between the block and a neighboring block of the block can be disabled (e.g., a boundary strength (Bs) is set to 0).

In an example, the block and the neighboring block are coded with the palette coding mode, and thus the boundary is between two palette coded blocks or both sides of the boundary are palette coded blocks. The DBF across the boundary can be disabled or can be determined to be disabled when the block and the neighboring block that are on two sides of the boundary are coded with the palette coding mode.

In an example, the block and the neighboring block are coded with the IBC mode, and thus the boundary is between two IBC coded blocks. The DBF across the boundary can be disabled when the block and the neighboring block that are on the two sides of the boundary are coded with the IBC mode.

In an example, one of the block and the neighboring block is coded with the palette coding mode, and another one of the block and the neighboring block is coded with the IBC mode. The boundary is between a palette coded block and an IBC coded block. Accordingly, the DBF across the boundary can be disabled.

In an example, one of the block and the neighboring block is coded with the palette coding mode. Thus, the boundary is between a palette coded block and a block coded with any suitable prediction mode (e.g., a SCC tool, an intra prediction mode, an inter prediction mode, or the like). Accordingly, the DBF across the boundary can be disabled.

In an example, one of the block and the neighboring block is coded with the IBC mode. Thus, the boundary is between an IBC block and a block coded with any suitable prediction mode (e.g., a SCC tool, an intra prediction mode, an inter prediction mode, or the like). Accordingly, the DBF across the boundary is disabled.

In an example, one of the block and the neighboring block is coded with the palette coding mode. Further, the first QP of the block and/or a second QP of the neighboring block satisfy a certain condition. Accordingly, the DBF across the boundary is disabled. In an example, the condition is that the first QP of the block is below a threshold. In an example, the condition is that the first QP of the block and the second QP of the neighboring block are below the threshold. The threshold can be any suitable value, such as 22. The threshold can be signaled or pre-determined.

In an example, one of the block and the neighboring block is coded with the IBC mode. Further, the first QP of the block and/or the second QP of the neighboring block satisfy the certain condition as described above. Accordingly, the DBF across the boundary is disabled. In an example, the condition is that the first QP of the block is below the threshold as described above. In an example, the condition is that the first QP of the block and the second QP of the neighboring block are below the threshold.

In an embodiment, for the block that is coded with the palette coding mode or the IBC mode, one or more loop filters (e.g., an ALF, a SAO filter, a bi-lateral filter, or the like) that are different from the DBF can be disabled (or disallowed, also referred to as turned off). The one or more loop filters that are different from the DBF can be for the block where the one or more loop filters can be applied to the block. For example, the one or more loop filters can be applied to samples within the block. In an example, whether to disable the one or more loop filters for the block is based on the first QP and the first prediction mode of the block. For example, when the first QP is less than the threshold and the block is coded with the palette coding mode, the one or more loop filters for the block are disabled. In an example, when the first QP is less than the threshold and the block is coded with the IBC mode, the one or more loop filters for the block are disabled.

In some examples, whether to disable the one or more loop filters for the block is based on at least one of: the first QP, the first prediction mode of the block, the second QP, and the second prediction mode. In an example, when the first QP of the block is below the threshold and one of the first prediction mode and the second prediction mode is the palette coding mode, the one or more loop filters for the block are disabled. In an example, when the first QP and the second QP are below the threshold and one of the first prediction mode and the second prediction mode is the palette coding mode, the one or more loop filters for the block are disabled. In an example, when the first QP of the block is below the threshold and one of the first prediction mode and the second prediction mode is the IBC mode, the one or more loop filters for the block are disabled. In an example, when the first QP and the second QP are below the threshold and one of the first prediction mode and the second prediction mode is the IBC mode, the one or more loop filters for the block are disabled.

According to aspects of the disclosure, coding information of a current block can be decoded from a coded video bitstream. The coding information can indicate that a first prediction mode of the current block is an SCC tool or one of a plurality of SCC tools (e.g., the IBC mode, the palette coding mode, the BDPCM mode, the TS mode, and the like). In some examples, the first prediction mode is the IBC mode or the palette coding mode. Whether at least one loop filter associated with the current block is disabled can be determined based on at least one of the first prediction mode of the current block and a first QP of the current block. In an example, in response to disabling the at least one loop filter, the current block can be reconstructed without the at least one loop filter. In an example, in response to not disabling the DBF, the current block is reconstructed with the at least one loop filter. In some examples, the at least one loop filter for the current block includes at least one of an ALF, a SAC) filter, and a bi-lateral filter. The at least one loop filter is for the current block and can be different from a DBE Accordingly, when the at least one loop filter is enabled for the current block, the at least one loop filter can be applied to the current block, and thus samples within the current block may be modified (or filtered) by the at least one loop filter. Whether the at least one loop filter is disabled can be determined based on the first QP and the first prediction mode of the current block.

In an embodiment, the at least one loop filter is a DBF for a boundary between the current block and a neighboring block of the current block. The first prediction mode is the IBC mode or the palette coding mode. Whether the DBF for the boundary between the current block and the neighboring block is disabled can be determined based on at least one of (i) the first prediction mode of the current block, (ii) a second prediction mode of the neighboring block, (iii) the first QP of the current block, and (iv) a second QP of the neighboring block. Whether the DBF for the boundary between the current block and the neighboring block is disabled can be determined based on at least one of the first prediction mode and the second prediction mode.

In an example, the DEW for the boundary between the current block and the neighboring block is determined to be disabled when at least one of the first prediction mode and the second prediction mode is one of (i) the IBC mode and (ii) the palette coding mode. In an example, the DBF for the boundary between the current block and the neighboring block is determined to be disabled when (i) the first QP is less than the threshold (e.g., 22) or the first QP and the second QP are less than the threshold and (ii) one of the first prediction mode and the second prediction mode is the palette coding mode or the IBC mode.

A high-level flag (also referred to as a high-level control flag, a filter control flag, a disable control flag, a high-level disable control flag) can be used to disallow or disable at least one loop filter for at least one SCC tool. As described above, the filter control flag can be in one or a combination of levels: a SPS, a PPS, a picture header, a slice header, a tile, a tile group, and/or a sub-picture level that is similar to a tile or a tile group. Thus, the filter control flag can be associated with a group of blocks and thus control the at least one loop filter for one or more of the group of blocks. The group of blocks can be in a sequence, a picture, a slice, a tile, a tile group, or a suitable sub-picture level. The group of blocks can include multiple blocks. In an example, using the high-level control flag to control the at least one loop filter at a level that is higher than a block level, for example, for a plurality of blocks can be more efficient than controlling the at least one loop filter at the block level, for example, for each block.

According to aspects of the disclosure, coding information for the group of blocks that includes a current block can be decoded from a coded video bitstream. The coding information can indicate the filter control flag associated with the group of blocks, for example, in a sequence, a picture, a slice, a tile, a tile group, or a suitable sub-picture level. The current block can be coded with a SCC tool. in an example, a prediction mode of the current block is the SCC tool. Whether at least one loop filter for the current block is disabled can be determined based on the filter control flag. In an example, in response to the at least one loop filter being determined as disabled, the current block can be reconstructed without the at least one loop filter.

In an embodiment, the at least one loop filter for the current block can be determined to be disabled based on the filter control flag, for example, when the filter control flag associated with the group of blocks is true (or the filter control flag is turned on). Thus, in an example, the at least one loop filter does not apply to samples (e.g., in one or more of the group of blocks) that are coded in any suitably selected SCC tool(s) (e.g., the IBC mode). The selected SCC tool(s) are supported by a codec. In an example, the group of blocks is coded with one or more of the selected SCC tool(s), such as the IBC mode, and thus the at least one loop filter is disabled for the samples in the group of blocks. In an example, a first subset of the group of blocks is coded with one or more of the selected SCC tool(s), and a second subset of the group of blocks is coded with prediction mode(s) that are different from the selected SCC tool(s), such as inter prediction mode(s). Accordingly, the at least one loop filter is disabled for samples in the first subset of the group of blocks, and the at least one loop filter may be applied for samples in the second subset of the group of blocks.

In an example, when the filter control flag is false (or the filter control flag is turned off), the at least one loop filter may apply to samples that are coded in a selected SCC tool provided certain conditions (also referred to as determination conditions) are met. In an example, the at least one loop filter is for the current block (e.g., applicable to the current and the conditions are for or related to the current block. In an example, the at least one loop filter is a DBF and thus is applicable to a boundary between blocks. The DBF, when applied to the boundary, can modify samples in the blocks that are on two sides of the boundary. The conditions are for a boundary between blocks (e.g., the current block and a neighboring block), and thus the conditions are related to the blocks that are on two sides of the boundary.

In an embodiment, the filter control flag is specific to the SCC tool. The at least one loop filter for the current block is determined to be disabled based on the filter control flag that is specific to the SCC tool. For example, the at least one loop filter is determined to be disabled when the filter control flag is specifically signaled for the SCC tool and the filter control flag is true. In an example, for each SCC tool (e.g., the IBC mode, the palette coding mode, the TS mode, the BDPCM mode, or the like), a corresponding filter control flag (or a SCC tool-specific filter control flag) is signaled. When the corresponding filter control flag is turned on or is true, the at least one loop filter does not apply to samples that are coded in the SCC tool (e.g., the MC mode). For example, the SCC tool is the MC mode, and the corresponding filter control flag is for the MC mode. When the corresponding filter control flag for the MC mode is true, the at least one loop filter does not apply to samples that are coded in the IBC mode. When the corresponding filter control flag is turned off (or is false), the at least one loop filter may be applied to samples that are coded in the selected SCC tool provided that the determination conditions are met. In an example, the conditions are for the current block, as described above. In an example, the at least one loop filter is a DBF, and the conditions are for a boundary between blocks (e.g., the current block and a neighboring block), as described above.

As described above, the at least one loop filter for the current block can be determined to be disabled based on the filter control flag where the filter control flag can be associated with the group of blocks or be specific to the SCC tool.

In an embodiment, the filter control flag can be specific to the SCC tool or applicable to a plurality of SCC tools including the SCC tool. The filter control flag can be conditionally signaled based on whether a SCC flag is signaled in a level higher than a block level to indicate that the SCC tool or the plurality of SCC tools is enabled for the level higher than the block level, as described above.

As described above, the current block can be coded with the SCC tool. In an embodiment, the filter control flag is specific to the SCC tool. The filter control flag can be conditionally signaled based on whether a SCC flag (or a high-level enabling flag) is signaled, for example, in a level higher than the block level, to indicate that the SCC tool is enabled for the level higher than the block level.

In an example, the filter control flag to control a usage of the at least one loop filter is conditionally signaled by the high-level enabling flag of the SCC tool. For example, the SCC tool is the IBC mode and the at least one loop filter is the DBF, and thus the filter control flag to control a usage of the DBF for one or more of the group of blocks coded in the IBC mode is signaled only when the high-level enabling flag of the IBC mode is turned on (or is true). Otherwise, the filter control flag for the IBC mode is not signaled and can be inferred to be false (or turned off).

Thus, in an example, the filter control flag is only signaled when the SCC tool is used. For example, the high-level enabling flag of the IBC mode is signaled at a first level (e.g., a sequence level). The filter control flag for the IBC mode is signaled at a second level (e.g., a picture level). The filter control flag for the IBC mode is only signaled when the high-level enabling flag of the IBC mode at the sequence level is turned on. The first level and the second level can be identical or different. The first level and the second level can be a level higher than the block level.

In an embodiment, the filter control flag is applicable to a plurality of SCC tools including the SCC tool and is conditionally signaled based on whether a SCC flag (or a high level enabling flag) is signaled, for example, in a level higher than the block level, to indicate that the plurality of SCC tools is enabled for the level higher than the block level. In an example, the filter control flag is conditionally signaled when the SCC flag is signaled in the level higher than the block level to indicate that the plurality of SCC tools is enabled for the level higher than the block level.

In an example, the filter control flag to control the usage of the at least one loop filter is for the plurality of SCC tools and is conditionally signaled by a high level enabling flag that can enable the plurality of SCC tools. The plurality of SCC tools can include all SCC tools supported by a codec. In general, the plurality of SCC tools can include any suitable SCC tool(s) supported by the codec. in an example, the plurality of SCC tools includes a combination of the .IBC mode, the palette coding mode, the TS mode, and the BDPCM mode. One or more of the above SCC tools can be excluded from the plurality of SCC tools, and additional SCC tool(s) can be added to the plurality of SCC tools. In an example, the high level enabling flag that can enable the plurality of SCC tools is true (or turned on), the filter control flag for the plurality of SCC tools is signaled. In an example, the high level enabling flag that can enable the plurality of SCC tools is false (or turned off), the filter control flag for the plurality of SCC tools is not signaled. When the filter control flag is not signaled, the filter control flag can be inferred to be false (or turned off).

In an embodiment, the filter control flag is applicable to a plurality of SCC tools including the SCC tool and is conditionally signaled based on whether a SCC flag is signaled, for example, in a level higher than the block level, to indicate that the SCC tool is enabled for the level higher than the block level. In an example, the filter control flag to control the usage of the at least one loop filter is for the plurality of SCC tools and is conditionally signaled by the SCC flag (or a high level enabling flag) that can enable any selected one of the plurality of SCC tools. The selected one of the plurality of SCC tools is supported by a codec. The plurality of SCC tools can include all SCC tool(s) supported by a codec, as described above. In an example, the plurality of SCC tools includes a combination of the IBC mode, the palette coding mode, the TS mode, the BDPCM mode, and/or additional SCC mode(s).

In an example, the high level enabling flag is true (or turned on) at a high level syntax, and the selected one of the plurality of SCC tools is enabled. The filter control flag for the plurality of SCC tools can be signaled. In an example, the high level enabling flag is false (or turned off), the filter control flag for the plurality of SCC tools is not signaled. When the filter control flag is not signaled, the filter control flag can be inferred to be false (or turned off).

In an embodiment, whether to disable the at least one loop filter can be determined based on the filter control flag and the QP of the current block. For example, the at least one loop filter is only disabled when the QP for the current block (e.g., a coding block) is within a value range (e.g., a pre-determined value range, a given value range) and the filter control flag is turned on. The value range can be any suitable range, such as the QP is larger than or equal to a threshold (e.g., 22). In an example, the value range is that the QP is less than or equal to a threshold (e.g., 22). The value range can be inferred or signaled. The threshold can be any suitable value, and can be inferred or signaled.

In an embodiment, the at least one loop filter includes a DBF, such as for a boundary between the current block and a neighboring block in the group of blocks. Whether the DBE for the boundary between the current block and the neighboring block is disabled can be based on the filter control flag and at least one of (i) the SCC tool of the current block and (ii) a prediction mode of the neighboring block. The DBF for the boundary between the current block and the neighboring block can be determined to be disabled when the filter control flag is turned on and the at least one of (i) the prediction mode of the current block and (ii) the prediction mode of the neighboring block is a SCC tool (e.g., the IBC mode).

As described above, the disabling of the DBF for the boundary may be applied when samples of at least one of the two sides (e.g., the current block and the neighboring block) of the boundary are coded by the selected SCC tool(s). For example, when the filter control flag is turned on, and other determination condition(s) (e.g., QP(s) are in a range, such as the QP(s) are less than or equal to 22), the DBF is disabled for samples that are coded in, for example, the IBC mode and the QP(s) are for respective blocks including the samples. In an example, the DBF is disabled for samples along the boundary only when the two sides are coded in the IBC mode.

Figure 14:
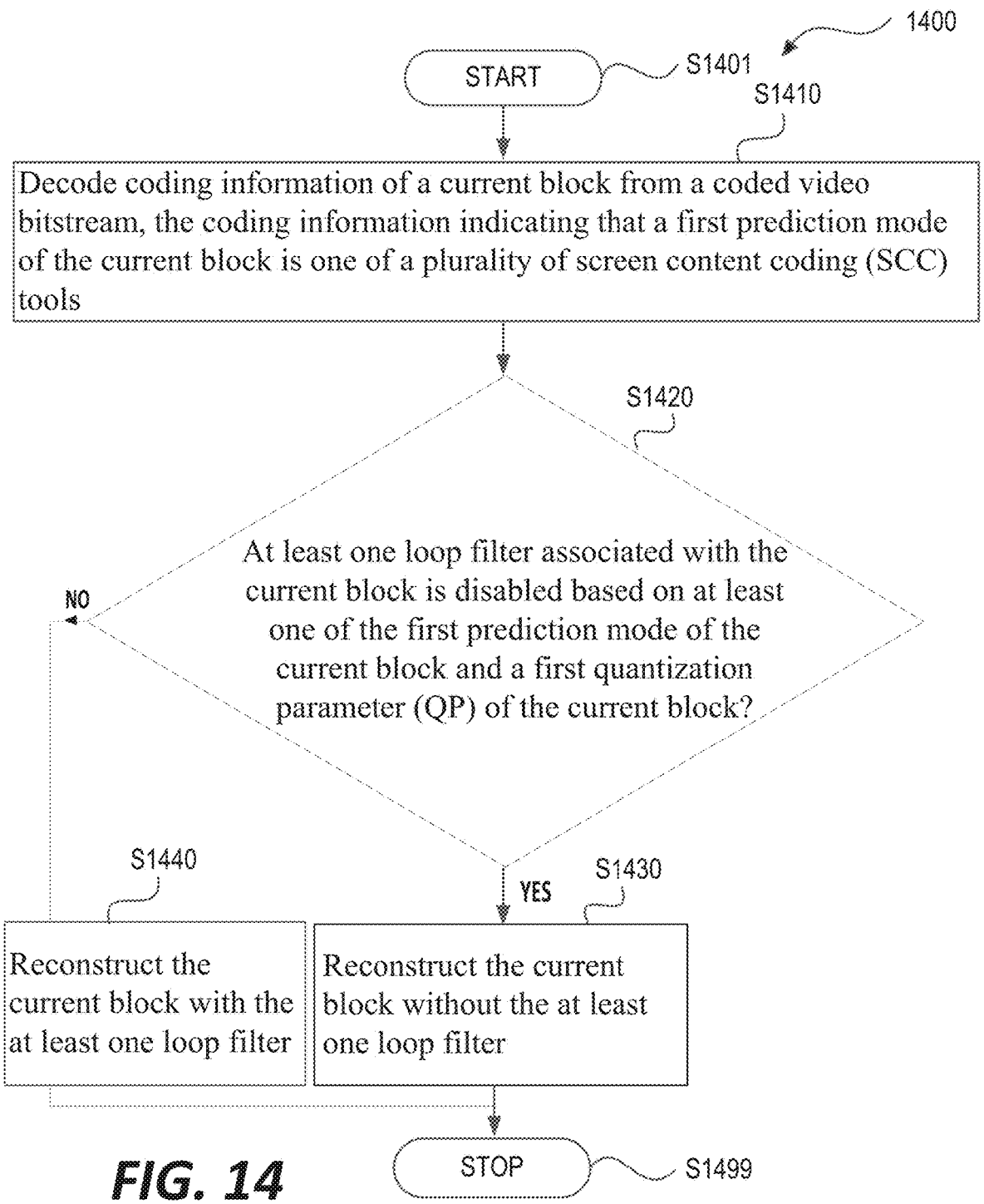
FIG. 14 shows a flow chart outlining a process (1400) according to an embodiment of the disclosure.

FIG. 14 shows a flow chart outlining a process (1400) according to an embodiment of the disclosure. The process (1400) can be used in the reconstruction of a current block, so as to generate a prediction block for the current block under reconstruction. In various embodiments, the process (1400) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like.

In some embodiments, the process (1400) is implemented in software instructions, this when the processing circuitry executes the software instructions, the processing circuitry performs the process (1400). The process starts at (S1401) and proceeds to (S1410).

At (S1410), coding information of the current block can be decoded from a coded video bitstream. The coding information can indicate that a first prediction mode of the current block is one of a plurality of SCC tools. The one of the plurality of SCC tools can be any suitable SCC tool. In an example, the first prediction mode is the IBC mode or the palette coding mode.

At (S1420), whether at least one loop filter associated with the current block is disabled can be determined based on at least one of the first prediction mode of the current block and a first QP of the current block, as described above. In response to disabling the at least one loop filter, the process (1400) proceeds to (S1430). Otherwise, the process (1400) proceeds to (S1440), At (S1430), in response to the at least one loop filter being disabled, the current block can be reconstructed without the at least one loop filter. The process (1400) proceeds to (S1499), and terminates.

At (S1440), in response to the at least one loop filter not being disabled, the current block may be reconstructed with the at least one loop filter, for example, applied to a boundary between the current block and the neighboring block. The process (1400) proceeds to (S1499), and terminates.

The process (1400) can be suitably adapted to various scenarios and steps in the process (1400) can be adjusted accordingly. One or more of the steps in the process (1400) can be adapted, omitted, repeated, and/or combined. Any suitable order can be used to implement the process (1400). Additional step(s) can be added to the process (1400).

Figure 15:
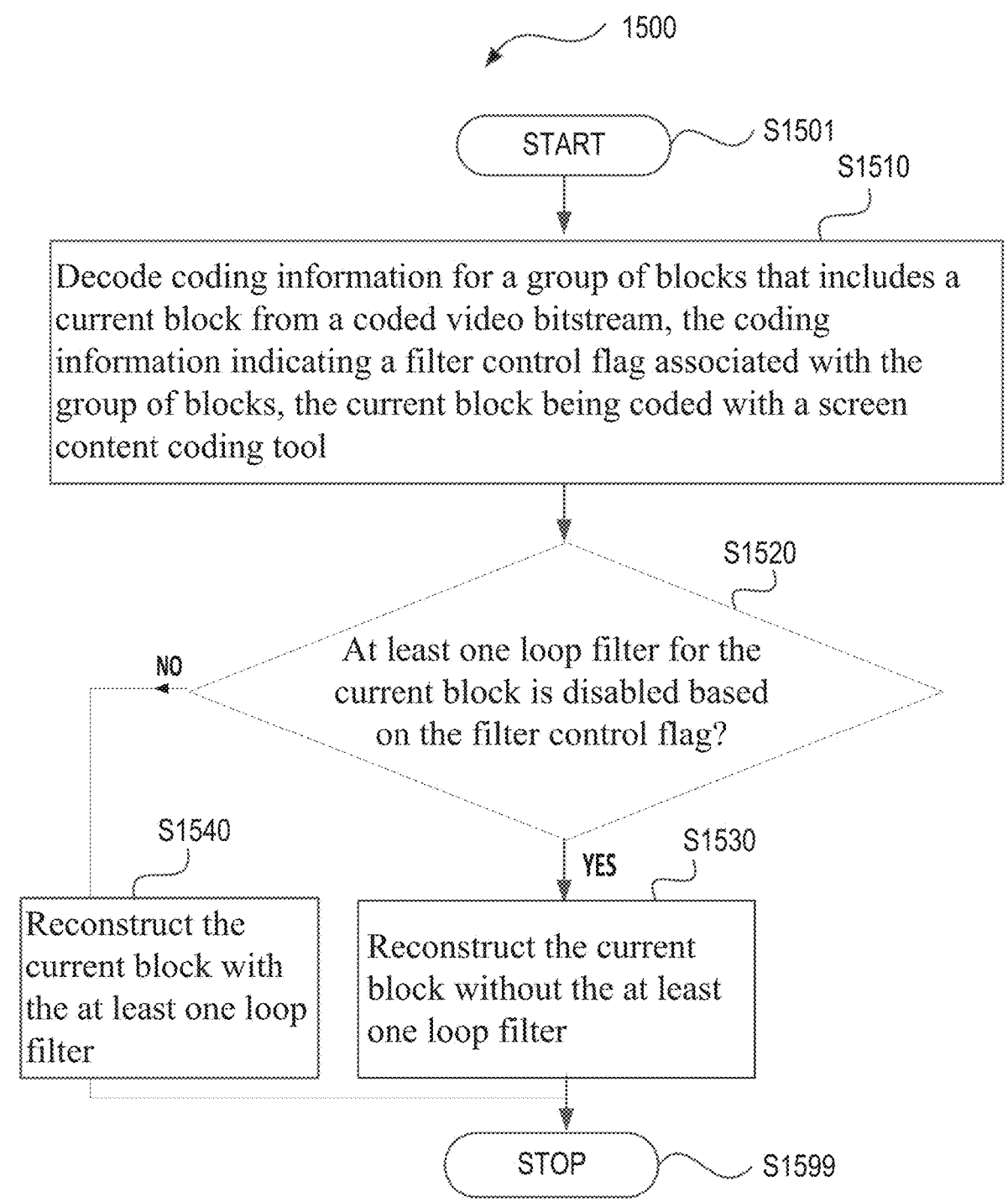
FIG. 15 shows a flow chart outlining a process (1500) according to an embodiment of the disclosure.

FIG. 15 shows a flow chart outlining a process (1500) according to an embodiment of the disclosure. The process (1500) can be used in the reconstruction of a current block, so to generate a prediction block for the current block under reconstruction. In various embodiments, the process (1500) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1500) is implemented in software instructions, thus when the processing circuitry executes the software instructions, the processing circuitry performs the process (1500). The process starts at (S1501) and proceeds to (S1510).

At (S1510), coding information for a group of blocks that includes the current block can be decoded from a coded video bitstream. The coding information can indicate a filter control flag associated with the group of blocks. The current block can be coded with a SCC tool.

At (S1520), whether at least one loop filter for the current block is disabled can be determined based on the filter control flag, as described above. In response to disabling the DBF, the process (1500) proceeds to (S1530). Otherwise, the process (1500) proceeds to (S1540).

At (S1530), in response to the at least one loop filter being disabled, the current block can be reconstructed without the at least one loop filter. The process (1500) proceeds to (S1599), and terminates.

At (S1540), in response to the at least one loop filter not being disabled, the current block can be reconstructed with the at least one loop filter, for example, when certain determination condition(s) are satisfied, as described above. The process (1500) proceeds to (S1599), and terminates.

The process (1500) can be suitably adapted to various scenarios and steps in the process (1500) can be adjusted accordingly. One or more of the steps in the process (1500) can be adapted, omitted, repeated, and/or combined. Any suitable order can be used to implement the process (1500). Additional step(s) can be added.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, Internet of things devices, and the like.

Figure 16:
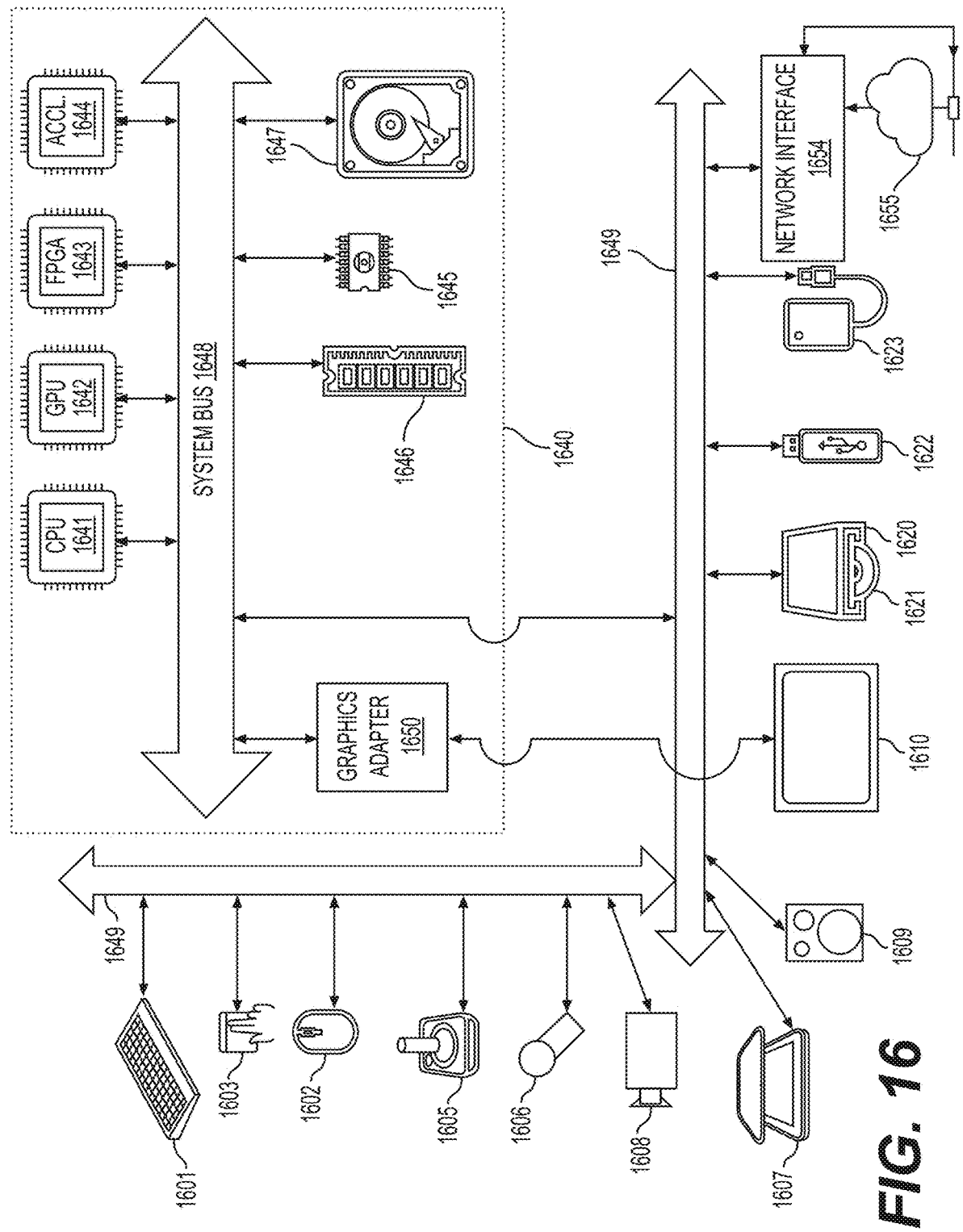
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANBus to certain CANBus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapter (1650), and so forth. These devices, along with Read-only memory (ROM) (1645), Random-access memory (1646), internal mass storage such as internal non-user accessible hard drives. SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, a display (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
JEM: joint exploration model
VVC: versatile video coding
BMS: benchmark set
MV: Motion Vector
MVP: Motion Vector Prediction
AMVP: Advanced Motion Vector Prediction
DM: Derived Mode
MPM: Most Probable Mode
QP: Quantization Parameter
ALF: Adaptive Loop Filter
SAO: Sample Adaptive Offset
HEVC: High Efficiency Video Coding
HEVC SCC: HEVC Screen Content Coding
SET: Supplementary Enhancement Information
VUI: Video Usability Information
GOPs: Groups of Pictures
TUs: Transform Units
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
ULF: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
BV: Block Vector
CPR: Current Picture Reference
MC: Intra Block Copy
DPB: Decoding Picture Buffer While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   decoding coding information of a current block from a coded video bitstream, the coding information including a first prediction mode of the current block, the first prediction mode being one of (i) an intra block copy (IBC) mode, or (ii) a palette coding mode;
   in response to a determination that the coding information indicates that the first prediction mode is the IBC mode or the palette coding mode, determining that a loop filter is disabled based on a determination that a non-zero first quantization parameter (QP) of the current block and a non-zero second QP of a neighboring block are less than a threshold; and
   reconstructing the current block based on the first prediction mode of the coding information, and based on the determination of whether the loop filter is disabled.

2. The method of claim 1, wherein
   the loop filter is a deblocking filter (DBF) for a boundary between the current block and the neighboring block; and
   the determining whether the loop filter is disabled further includes:
      determining whether the DBF for the boundary between the current block and the neighboring block is disabled is further based on a second prediction mode of the neighboring block.

3. The method of claim 2, wherein the determining whether the DBF for the boundary is disabled further comprises:
   determining that the DBF for the boundary between the current block and the neighboring block is disabled in response to a determination that (i) a first QP of the current block and the second QP are less than the threshold and that (ii) the second prediction mode is the palette coding mode or the IBC mode.

4. The method of claim 1, wherein
   the loop filter for the current block includes at least one of an adaptive loop filter, a sample adaptive offset filter, and a bi-lateral filter; and
   the determining includes determining whether the loop filter is disabled further based on the first QP of the current block and the first prediction mode.

5. An apparatus for video decoding, comprising:

processing circuitry configured to:

decode coding information of a current block from a coded video bitstream, the coding information including a first prediction mode of the current block, the first prediction mode being one of (i) an intra block copy (IBC) mode, or (ii) a palette coding mode;

in response to a determination that the coding information indicates that the first prediction mode is the IBC mode or the palette coding mode, determine that a loop filter is disabled based on a determination that a non-zero first quantization parameter (QP) of the current block and a non-zero second QP of a neighboring block are less than a threshold; and reconstruct the current block based on the first prediction mode of the coding information, and based on the determination of whether the loop filter is disabled.

6. The apparatus of claim 5, wherein the loop filter is a deblocking filter (DBF) for a boundary between the current block and the neighboring block; and the processing circuitry is configured to:

determine whether the DBF for the boundary between the current block and the neighboring block is disabled further based on a second prediction mode of the neighboring block.

7. The apparatus of claim 6, wherein the processing circuitry is further configured to:

determine that the DBF for the boundary between the current block and the neighboring block is disabled in response to a determination that (i) a first QP of the current block and the second QP are less than the threshold and that (ii) the second prediction mode is the palette coding mode or the IBC mode.

8. The apparatus of claim 5, wherein the loop filter for the current block includes at least one of an adaptive loop filter, a sample adaptive offset filter, and a bi-lateral filter; and the processing circuitry is further configured to determine whether the loop filter is disabled further based on a first QP of the current block and the first prediction mode.

9. A non-transitory computer-readable storage medium storing computer-readable instructions thereon, which, when executed by processing circuitry, cause the processing circuitry to perform a method for video decoding in a decoder, comprising:

decoding coding information of a current block from a coded video bitstream, the coding information including a first prediction mode of the current block, the first prediction mode being one of (i) an intra block copy (IBC) mode, or (ii) a palette coding mode;

in response to a determination that the coding information indicates that the first prediction mode is the IBC mode or the palette coding mode, determining that a loop filter is disabled based on a determination that a non-zero first quantization parameter (QP) of the current block and a non-zero second QP of a neighboring block are less than a threshold; and reconstructing the current block based on the first prediction mode of the coding information, and based on the determination of whether the loop filter is disabled.

10. The non-transitory computer-readable storage medium of claim 9, wherein the loop filter is a deblocking filter (DBF) for a boundary between the current block and the neighboring block; and the determining whether the loop filter is disabled further includes:

determining whether the DBF for the boundary between the current block and the neighboring block is disabled is further based on a second prediction mode of the neighboring block.

11. The non-transitory computer-readable storage medium of claim 10, wherein the determining whether the DBF for the boundary is disabled further comprises:

determining that the DBF for the boundary between the current block and the neighboring block is disabled in response to a determination that (i) a first QP of the current block and the second QP are less than the threshold and that (ii) the second prediction mode is the palette coding mode or the IBC mode.

12. The non-transitory computer-readable storage medium of claim 9, wherein the loop filter for the current block includes at least one of an adaptive loop filter, a sample adaptive offset filter, and a bi-lateral filter; and the determining includes determining whether the loop filter is disabled further based on the first QP of the current block and the first prediction mode.

* * * * *